US012607749B2

(12) United States Patent
Iwase et al.

(10) Patent No.: US 12,607,749 B2
(45) Date of Patent: Apr. 21, 2026

(54) OBSTACLE DETECTION SYSTEM FOR WORK VEHICLE

(71) Applicant: Yanmar Power Technology Co., Ltd., Osaka (JP)

(72) Inventors: Takuya Iwase, Osaka (JP); Kazuhisa Yokoyama, Osaka (JP); Shiro Sugita, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 885 days.

(21) Appl. No.: 17/418,284

(22) PCT Filed: Oct. 29, 2019

(86) PCT No.: PCT/JP2019/042280
§ 371 (c)(1),
(2) Date: Jun. 25, 2021

(87) PCT Pub. No.: WO2020/137135
PCT Pub. Date: Jul. 2, 2020

(65) Prior Publication Data
US 2022/0091271 A1 Mar. 24, 2022

(30) Foreign Application Priority Data
Dec. 27, 2018 (JP) ................................. 2018-244266

(51) Int. Cl.
| | |
|---|---|
| *G01S 17/931* | (2020.01) |
| *G01S 17/89* | (2020.01) |
| *G05D 1/00* | (2006.01) |
| *G06F 18/25* | (2023.01) |
| *G06T 7/70* | (2017.01) |
| *H04N 23/90* | (2023.01) |

(52) U.S. Cl.
CPC ............ *G01S 17/931* (2020.01); *G01S 17/89* (2013.01); *G05D 1/0248* (2013.01); *G06F 18/251* (2023.01); *G06T 7/70* (2017.01); *H04N 23/90* (2023.01); *G06T 2207/30261* (2013.01)

(58) Field of Classification Search
USPC ....................................................... 348/148
See application file for complete search history.

(56) References Cited

U.S. PATENT DOCUMENTS

| | | | | |
|---|---|---|---|---|
| 2014/0350852 A1* | 11/2014 | Nordbruch | ........... | G06V 20/582 |
| | | | | 701/523 |
| 2019/0208111 A1* | 7/2019 | Wendel | .................. | H04N 23/75 |

* cited by examiner

*Primary Examiner* — Mikhail Itskovich
(74) *Attorney, Agent, or Firm* — Chris Mizumoto

(57) ABSTRACT

The obstacle detection system for a work vehicle enables an obstacle, present in the surroundings of a work vehicle, to be accurately detected. This obstacle detection system for a work vehicle has: a plurality of imaging devices that take images of the surroundings of a work vehicle; and an image processing device that performs, according to a time division system, an obstacle identification process for identifying an obstacle on the basis of the images from the plurality of imaging devices. The image processing device changes a to-be-processed cycle per unit time for the plurality of imaging devices in the time division system in accordance with the vehicle speed and the traveling direction of the work vehicle.

4 Claims, 16 Drawing Sheets

(a) FRONT IMAGE | FRONT IMAGE | FRONT IMAGE | RIGHT IMAGE | FRONT IMAGE | FRONT IMAGE | FRONT IMAGE | LEFT IMAGE (b) REAR IMAGE | REAR IMAGE | REAR IMAGE | RIGHT IMAGE | REAR IMAGE | REAR IMAGE | REAR IMAGE | LEFT IMAGE (c) FRONT IMAGE | FRONT IMAGE | RIGHT IMAGE | FRONT IMAGE | FRONT IMAGE | RIGHT IMAGE | LEFT IMAGE (d) FRONT IMAGE | FRONT IMAGE | LEFT IMAGE | FRONT IMAGE | FRONT IMAGE | RIGHT IMAGE | LEFT IMAGE (e) FRONT IMAGE | FRONT IMAGE | RIGHT IMAGE | FRONT IMAGE | FRONT IMAGE | LEFT IMAGE (f) FRONT IMAGE | FRONT IMAGE | RIGHT IMAGE | FRONT IMAGE | FRONT IMAGE | FRONT IMAGE | FRONT IMAGE | LEFT IMAGE

FIG.15

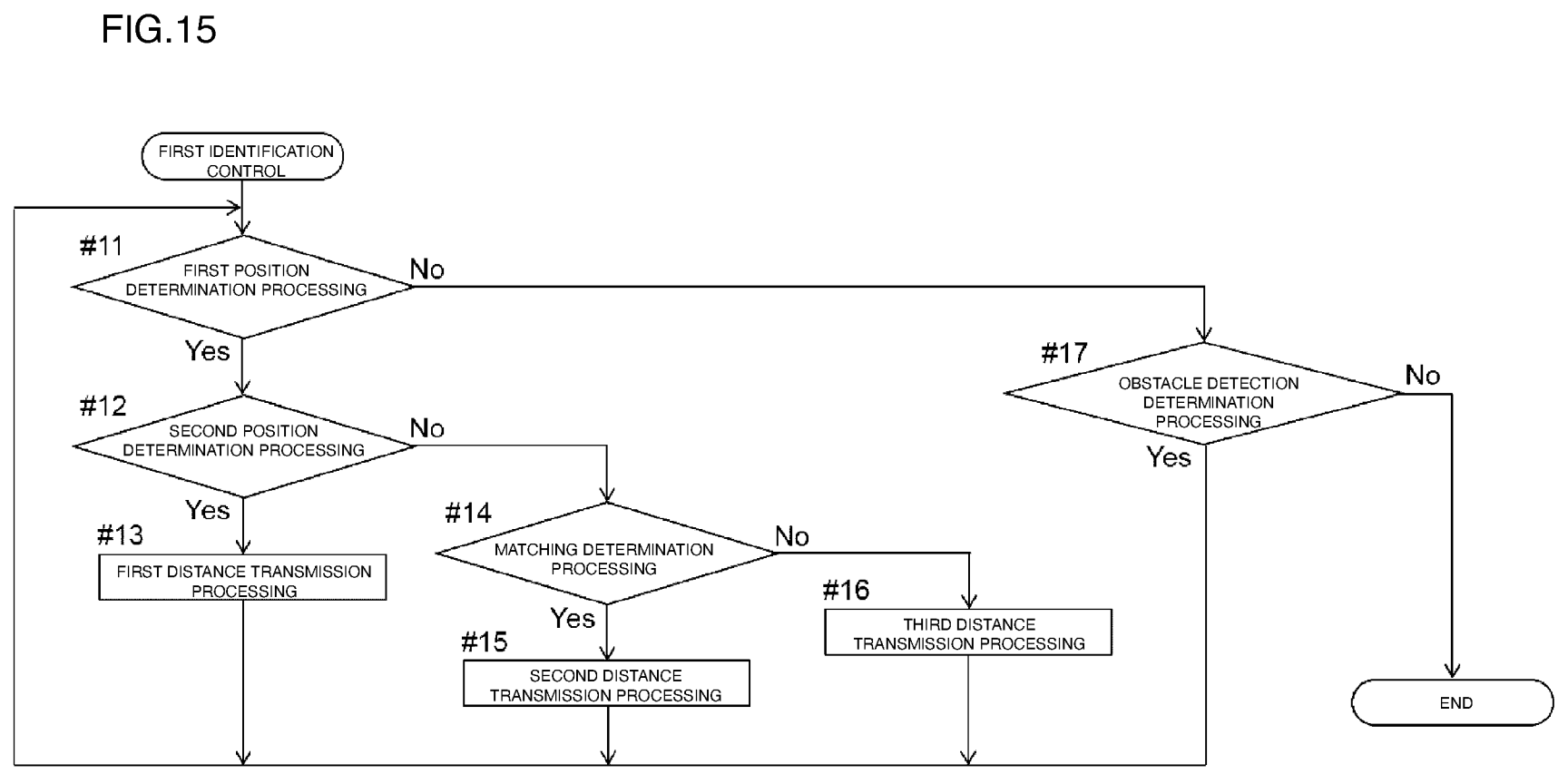

FIRST IDENTIFICATION CONTROL

11 FIRST POSITION DETERMINATION PROCESSING — No

Yes

12 SECOND POSITION DETERMINATION PROCESSING — No

Yes

13 FIRST DISTANCE TRANSMISSION PROCESSING

14 MATCHING DETERMINATION PROCESSING — No

Yes

15 SECOND DISTANCE TRANSMISSION PROCESSING

16 THIRD DISTANCE TRANSMISSION PROCESSING

17 OBSTACLE DETECTION DETERMINATION PROCESSING — No

Yes

END

FIG.16

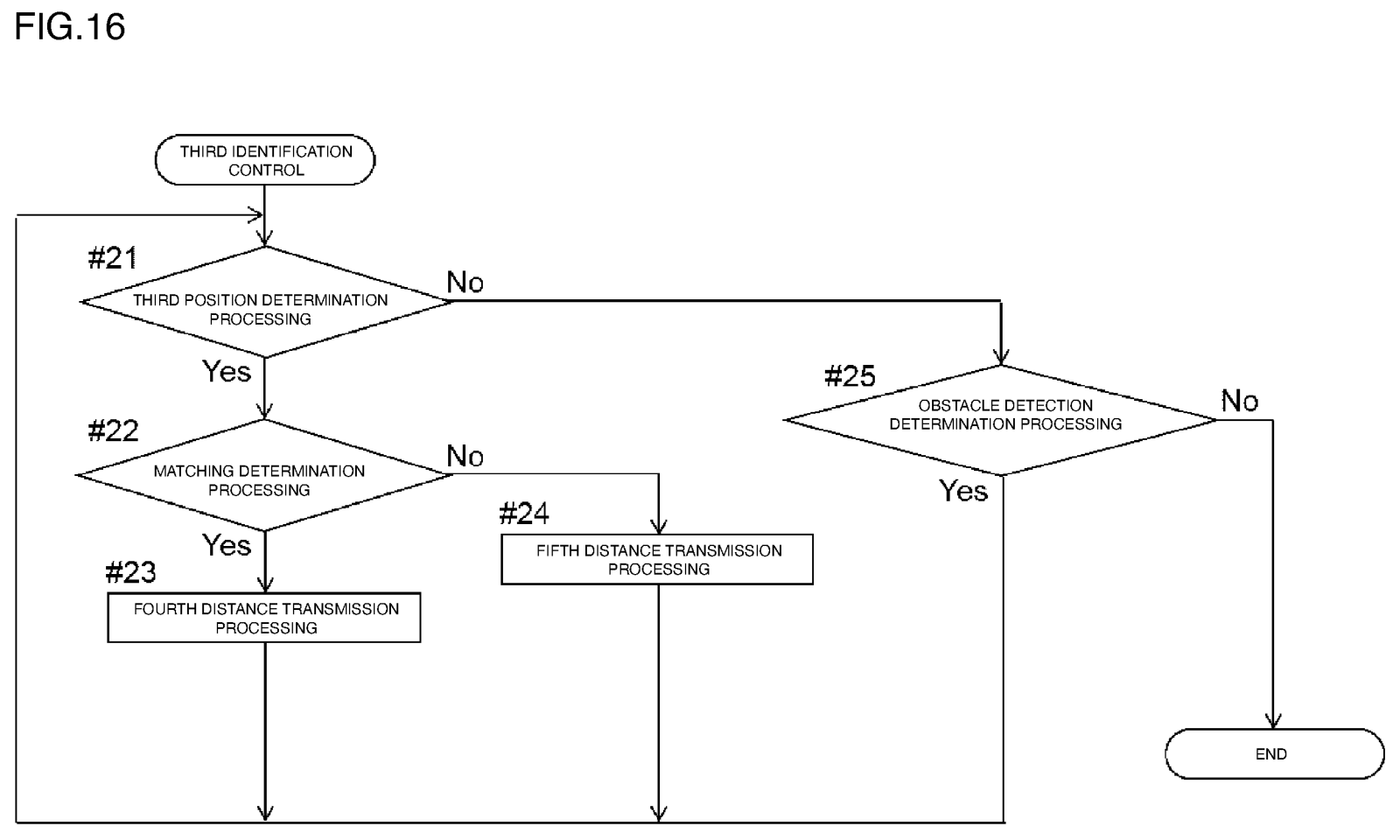

THIRD IDENTIFICATION CONTROL

21 THIRD POSITION DETERMINATION PROCESSING

No

Yes

22 MATCHING DETERMINATION PROCESSING

No

Yes

23 FOURTH DISTANCE TRANSMISSION PROCESSING

24 FIFTH DISTANCE TRANSMISSION PROCESSING

25 OBSTACLE DETECTION DETERMINATION PROCESSING

No

Yes

END

OBSTACLE DETECTION SYSTEM FOR WORK VEHICLE

CROSS-REFERENCE

This application is a US National Stage Application under 35 U.S.C. § 371 of International Application No. PCT/JP2019/042280 filed Oct. 29, 2019, which claims foreign priority of JP2018-244266 filed December 27, 2018, the disclosures of which are hereby incorporated by reference in their entirety.

TECHNICAL FIELD

The present invention relates to an obstacle detection system for a work vehicle, the obstacle detection system being used for an occupant work vehicle such as a tractor or a passenger mower and for an unmanned work vehicle such as an unmanned mower.

BACKGROUND ART

A work vehicle that is equipped with a peripheral monitoring system has been available (for example, see Patent Literature 1). The peripheral monitoring system includes: a plurality of obstacle detection sensors, each of which detects an obstacle present in surroundings of the work vehicle and acquires a relative position of the obstacle; a plurality of cameras, each of which acquires an image of the surroundings of the work vehicle; a bird's eye view image acquisition unit that acquires a bird's eye view image of the surroundings of the work vehicle on the basis of the plurality of the images acquired by the plurality of the cameras; a warning area setting unit that sets a warning area where it is necessary to warn a driver about the presence of the obstacle; and a warning unit that warns the driver about the presence of the obstacle in the case where the relative position of the obstacle is within the warning area in the bird's eye view image. The peripheral monitoring system is configured to monitor the surroundings of the work vehicle.

CITATION LIST

Patent Literature

Patent Literature 1: PCT International Publication No. 2012/169361

DISCLOSURE OF INVENTION

Problems to be Solved by the Invention

In the peripheral monitoring system disclosed in Patent Literature 1 described above, a radar device with low object discrimination accuracy is adopted as the obstacle detection sensor. Accordingly, when tall grass grows in the above-described warning area or when dirt, dust, or the like is stirred up as a floating matter in the warning area, the obstacle detection sensor may erroneously detect such tall grass or floating matter as the obstacle. When such erroneous detection occurs, the warning unit warns the driver about the presence of the obstacle in the warning area regardless of a fact that there is no obstacle that hinders travel of the work vehicle.

In view of such a circumstance, a primary purpose of the present invention is to develop an obstacle detection system for a work vehicle capable of detecting an obstacle present in surroundings of the work vehicle with a high degree of accuracy.

Means for Solving the Problems

A first characteristic configuration of the present invention is, in an obstacle detection system for a work vehicle including:
a plurality of imaging devices, each of which captures an image of surroundings of the work vehicle; and an image processing device that performs obstacle discrimination processing for discriminating an obstacle on the basis of the images from the plurality of imaging devices by a time division system,
that the image processing device changes a processing target cycle per unit time for each of the imaging devices in the time division system according to a travel direction and a vehicle speed of the work vehicle.

With this configuration, the image processing device performs the obstacle discrimination processing that is based on the captured image, object discrimination accuracy of which is high. Accordingly, for example, in the case where tall grass or the like exists in the travel direction of the work vehicle, it is possible to avoid such a possibility that the tall grass or the like is erroneously detected as the obstacle that hinders travel of the work vehicle. In addition, even in the case where dirt, dust, or the like is stirred up as a floating matter in the surroundings of the work vehicle, it is possible to avoid such a possibility that the floating matter is erroneously detected as the obstacle that hinders the travel of the work vehicle.

Then, when the image processing device performs the obstacle discrimination processing by the time division system, it is possible to promptly and sequentially perform the obstacle discrimination processing, for the image, a processing load of which is large, from each of the imaging devices by the single image processing device without delay.

For example, the image processing device shortens the processing target cycle per unit time for each of the imaging devices whose imaging range is the travel direction of the work vehicle according to the travel direction of the work vehicle, and extends the processing target cycle per unit time for each of the imaging devices whose imaging range is not the travel direction of the work vehicle. In this way, it is possible to focus on the discrimination of whether the object present in the travel direction of the work vehicle is the obstacle while the obstacle discrimination processing for the images from the imaging devices is sequentially and promptly performed by the single image processing device without delay.

Furthermore, for example, the image processing device shortens the processing target cycle per unit time for each of the imaging devices whose imaging range is the travel direction of the work vehicle with an increase in the vehicle speed of the work vehicle, and extends the processing target cycle per unit time for each of the imaging devices whose imaging range is not the travel direction of the work vehicle. In this way, it is possible to accelerate and focus on the discrimination of whether the object present in the travel direction of the work vehicle is the obstacle with the increase in the vehicle speed of the work vehicle while the obstacle discrimination processing for the images from the imaging devices is sequentially and promptly performed by the single image processing device without delay. As a result, it is possible to develop the obstacle detection system for the work vehicle capable of detecting the obstacle present in the surroundings of the work vehicle with a high degree of accuracy while simplifying the configuration.

A second characteristic configuration of the present invention is to have:

a plurality of active sensors, each of which measures a distance to a measurement target object present in surroundings of the work vehicle; and an obstacle detection device that detects a position of the obstacle and a distance to the obstacle on the basis of discrimination information from the image processing device and the measurement information from each of the active sensors.

With this configuration, the obstacle detection device detects the position of the obstacle and the distance to the obstacle on the basis of: the discrimination information from the image processing device that performs the obstacle discrimination processing based on the camera image with the high object discrimination accuracy; and the measurement information from active sensor units with high distance measurement accuracy. Accordingly, it is possible to detect the position of the obstacle and the distance from the work vehicle to the obstacle with the high degree of accuracy while avoiding a possibility of erroneous detection of tall grass existing in the travel direction of the work vehicle, a floating matter such as dirt or dust that is stirred up in the surroundings of the work vehicle, or the like as the obstacle.

A third characteristic configuration of the present invention is that the image processing device calculates coordinates of the obstacle and the distance to the obstacle on the image on the basis of the image from the imaging device, the active sensors are lidar sensors that sequentially measure a distance per coordinate of each of ranging points present as the measurement target objects in the surroundings of the work vehicle so as to extract a ranging point group of an obstacle candidate, and the obstacle detection device adopts a matching distance of the ranging point group as the distance to the obstacle in the case where the coordinates of the obstacle and the distance to the obstacle from the image processing device match the distance per coordinate of the ranging point group from the lidar sensors, and adopts the distance to the obstacle from the image processing device in a case of non-matching.

With this configuration, the obstacle detection device adopts the distance to the obstacle candidate, which is acquired from the lidar sensors with high distance measurement accuracy, as the distance to the obstacle only in the case where the coordinates of the obstacle and the distance to the obstacle, which are discriminated by the image processing device with the high object discrimination accuracy, match the distance per coordinate of the ranging point group as the obstacle candidate, which is extracted by the lidar sensors. Thus, it is possible to avoid such a possibility that the distance to the obstacle candidate at the time of the erroneous discrimination of the obstacle candidate by the lidar sensors is adopted as the distance to the obstacle.

As a result, the obstacle detection device can acquire the detection information on the obstacle with the high object discrimination accuracy and the high distance measurement accuracy. In addition, the obstacle detection device can acquire the distance to the obstacle from the image processing device in the case where the measurement accuracy of the lidar sensors is degraded or in the case where abnormality such as dirt on a sensor surface occurs to the lidar sensors due to the dirt, the dust, or the like that is stirred up as the floating matter around the lidar sensors.

A fourth characteristic configuration of the present invention is that in the case where the image processing device detects the obstacle, the active sensors measure the distance to the obstacle.

With this configuration, in the case where the image processing device detects the obstacle, the active sensors measure the distance to the obstacle. Therefore, it is possible to increase the degree of accuracy of the distance measurement for the obstacle while reducing a load required for the distance measurement.

BRIEF DESCRIPTION OF DRAWINGS

FIG. 3 is a side view of the tractor illustrating measurement ranges of each lidar sensor and a sonar, and the like.

FIG. 4 is a plan view of the tractor illustrating the measurement ranges of each of the lidar sensors and the sonar, and the like.

FIG. 10 is a view illustrating the detection range and the non-detection range of the obstacle in a lifted state of the work vehicle in the distance image by the rear lidar sensor.

FIG. 12 is a plan view illustrating a positional relationship between a mounted position of each camera and each of a vehicle body coordinate origin and a distance calculation reference point, and the like.

FIG. 14 includes diagrams, each of which illustrates a processing target cycle per unit time for each of the cameras by a time division system.

FIG. 15 is a flowchart illustrating control actuation of an obstacle detection device in first identification control.

FIG. 16 is a flowchart illustrating the control actuation of the obstacle detection device in third identification control.

DESCRIPTION OF EMBODIMENTS

A description will hereinafter be made on, as an example of a mode for carrying out the present invention, an embodiment in which an obstacle detection system for a work vehicle according to the present invention is applied to a tractor, which is an example of a work vehicle, with reference to the drawings. The obstacle detection system for the work vehicle according to the present invention can be applied to, in addition to the tractor, manned work vehicles, such as a manned mower, a manned transplanter, a combine, carrier, a snowplow, and a wheel loader, and unmanned work vehicles such as an unmanned mower, for example.

As illustrated in FIGS. 1 to 4, in a tractor 1 that is exemplified in the present embodiment, a rotary tiller 3, which is an example of a work device, is coupled in liftable and rollable manners to a rear portion of the tractor 1 via a three-point link mechanism 2. In this way, the tractor 1 is configured to have a rotary tillage specification. The tractor 1 can travel automatically in a field A, which is illustrated in FIG. 5 and an example of a work site, or the like by using an autonomous travel system for the work vehicle. Instead of the rotary tiller 3, any of various work devices such as a plow, a disc harrow, a cultivator, a subsoiler, a seeder, a spraying device, and a mowing device can be coupled to the rear portion of the tractor 1.

Figure 6:
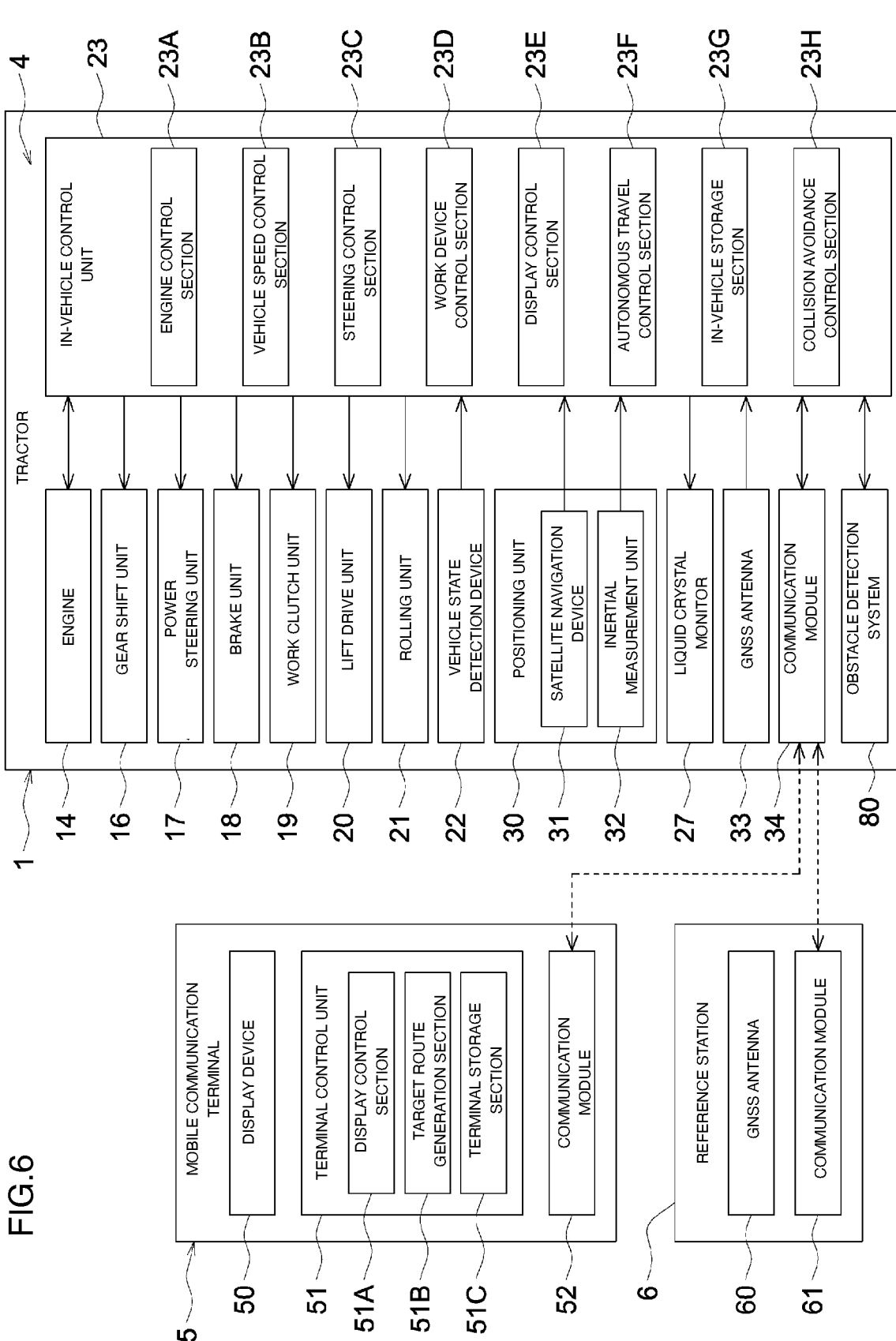
FIG. 6 is a block diagram illustrating the schematic configuration of the autonomous travel system for the work vehicle.

As illustrated in FIG. 6, the autonomous travel system includes: an autonomous travel unit 4 that is mounted on the tractor 1; and a mobile communication terminal 5 as an example of a wireless communication device that is set to communicate wirelessly with the autonomous travel unit 4. The mobile communication terminal 5 includes a multi-touch type display device (for example, a liquid crystal panel) 50 that allows various information displays, input operations, and the like related to autonomous travel.

A tablet-type personal computer, a smartphone, or the like can be adopted as the mobile communication terminal 5. For the wireless communication, wireless local area network (LAN) such as Wi-Fi®, short-range wireless communication such as Bluetooth®, or the like can be adopted.

As illustrated in FIGS. 1 to 3 and FIG. 6, the tractor 1 includes: right and left drivable and steerable front wheels 10; right and left drivable rear wheels 11; a cabin 13 that forms a boarding-type driving unit 12; an electronically controlled diesel engine (hereinafter referred to as an engine) 14 having a common rail system; a hood 15 that covers the engine 14 and the like; a gear shift unit 16 that shifts power from the engine 14; a full hydraulic power steering unit 17 that steers the right and left front wheels 10; a brake unit 18 that brakes the right and left rear wheels 11; a work clutch unit 19 of an electronic hydraulic control type that interrupts transmission to the rotary tiller 3; a lift drive unit 20 of an electronic hydraulic control type that drives the rotary tiller 3 up and down; a rolling unit 21 of an electronic hydraulic control type that drives the rotary tiller 3 in a roll direction; a vehicle state detection device 22 that includes various sensors, switches, and the like to detect various setting states, operation states of units, and the like in the tractor 1; an in-vehicle control unit 23 that has various control sections; and the like.

An electronically controlled gasoline engine having an electronic governor, or the like may be adopted as the engine 14. In addition, an electric power steering unit that has an electric motor for steering may be adopted as the power steering unit 17.

Figure 1:
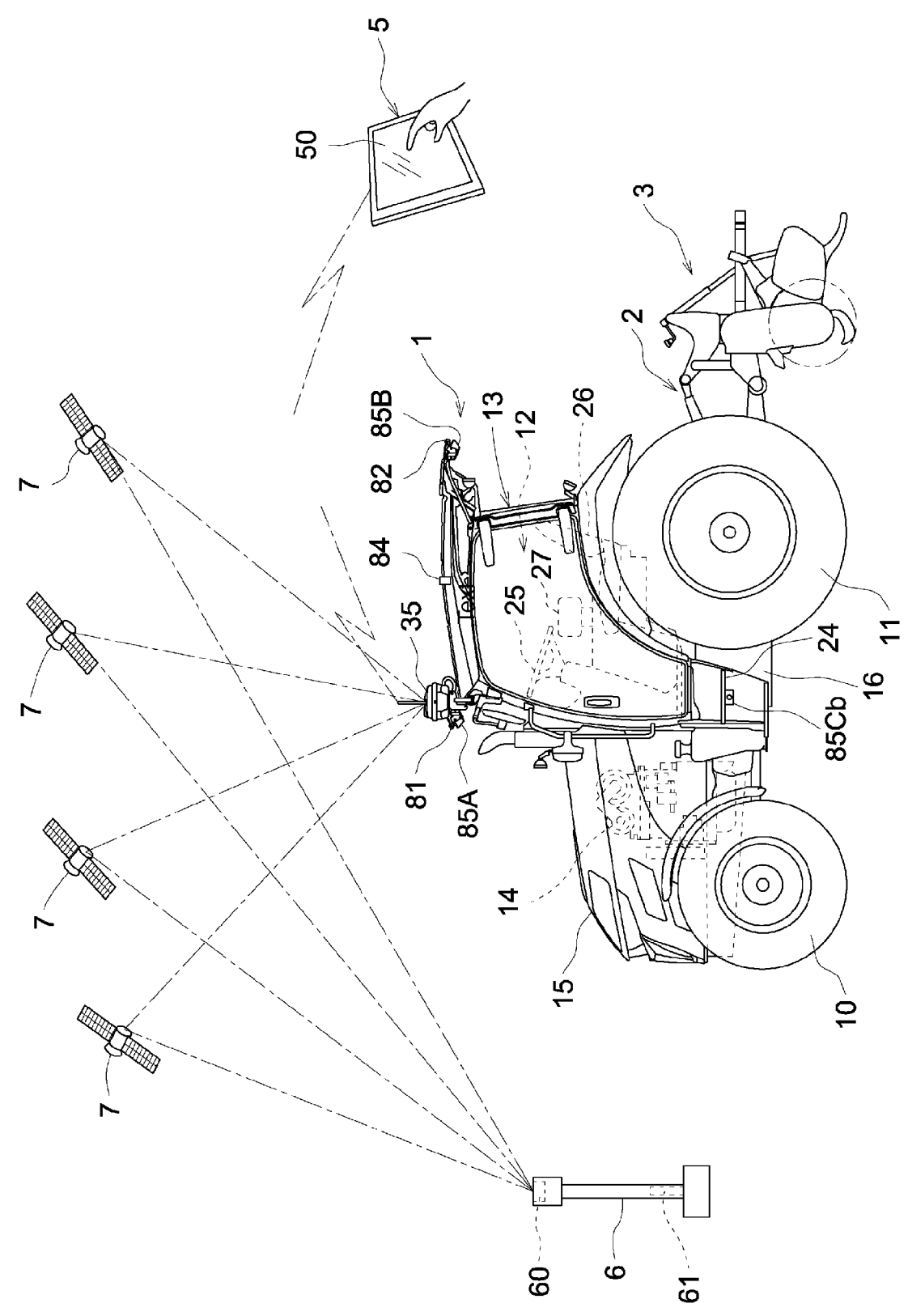
FIG. 1 is a view illustrating a schematic configuration of an autonomous travel system for a work vehicle.
Figure 3:
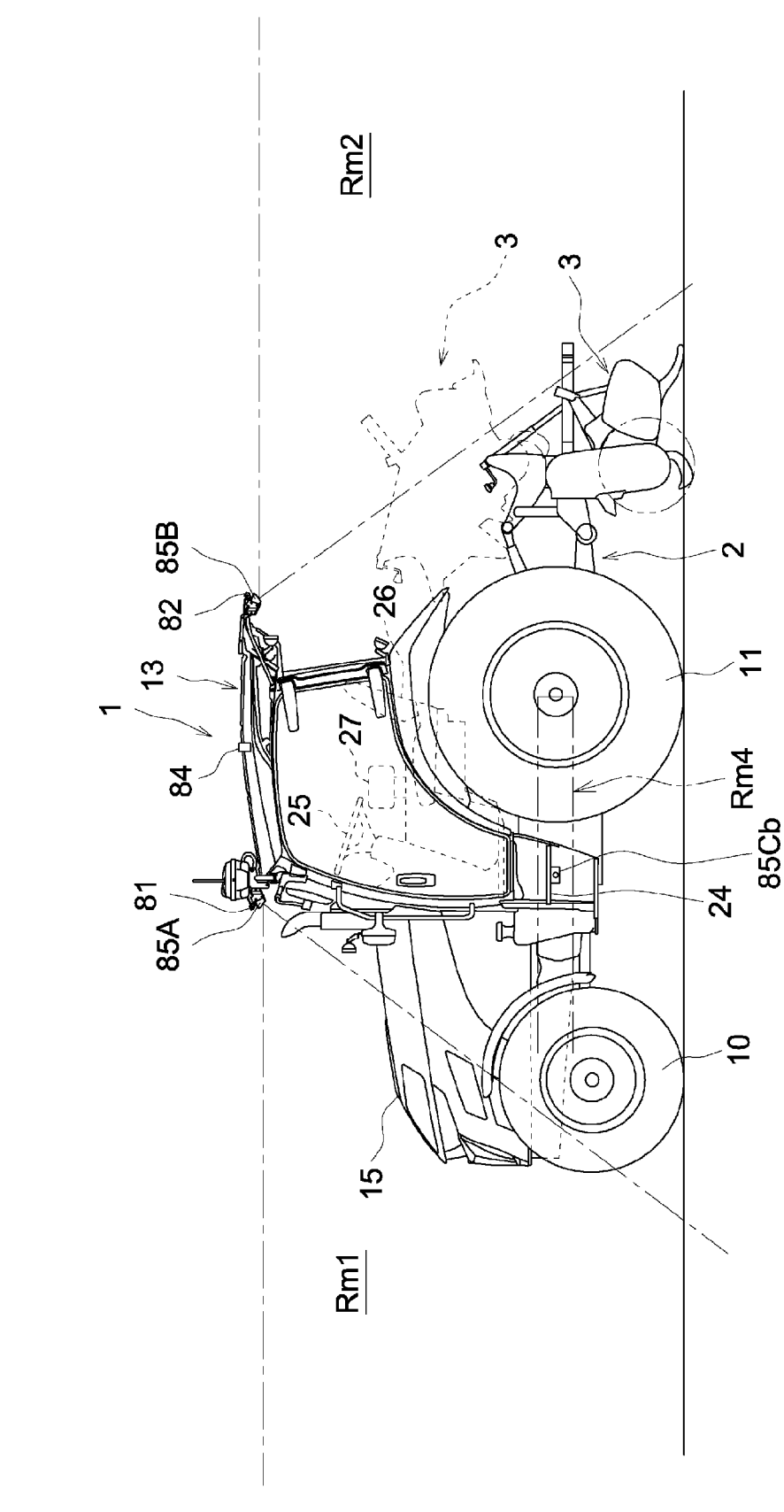

As illustrated in FIG. 1 and FIG. 3, the driving unit 12 includes: a steering wheel 25 for manual steering; a seat 26 for an occupant; and a multi-touch liquid crystal monitor 27 that allows the various information displays and the input operations. Although not illustrated, the driving unit 12 includes operation levers, such as an accelerator lever and a gear shift lever, operation pedals, such as an accelerator pedal and a clutch pedal, or the like.

Although not illustrated, the gear shift unit 16 includes: an electronically controlled continuously variable transmission that shifts the power from the engine 14; a forward-reverse switching device of an electronic hydraulic control type for switching the power, which has been shifted by the continuously variable transmission, between forward and reverse; and the like. An Integrated Hydro-static Mechanical Transmission (I-HMT) is adopted as the continuously variable transmission. The I-HMT is an example of a hydraulic mechanical continuously variable transmission that has higher transmission efficiency than a Hydro-static Transmission (HST). The forward-reverse switching device includes: a hydraulic clutch for interrupting forward power; a hydraulic clutch for interrupting reverse power; and an electromagnetic valve that controls a flow of oil with respect to those clutches. Instead of the I-HMT, a Hydraulic Mechanical Transmission (HMT) as an example of the hydraulic mechanical continuously variable transmission, the Hydro-static Transmission, a belt-type continuously variable transmission, or the like may be adopted as the continuously variable transmission. Alternatively, instead of the continuously variable transmission, the gear shift unit 16 may include a stepped transmission of an electronic hydraulic control type that has: a plurality of hydraulic clutches for gear shifting; and a plurality of electromagnetic valves for controlling the flow of the oil to those clutches.

Although not illustrated, the brake unit 18 includes: right and left brakes that brake the right and left rear wheels 11, respectively; a foot brake system that actuates the right and left brakes in an interlocking manner with depressing operations of right and left brake pedals provided in the driving unit 12; a parking brake system that actuates the right and left brakes in an interlocking manner with an operation of a parking lever provided in the driving unit 12; a turning brake system that actuates the brake on an inner side of a turn in an interlocking manner with steering of the right and left front wheels 10 at a set angle or larger; and the like.

Figure 7:
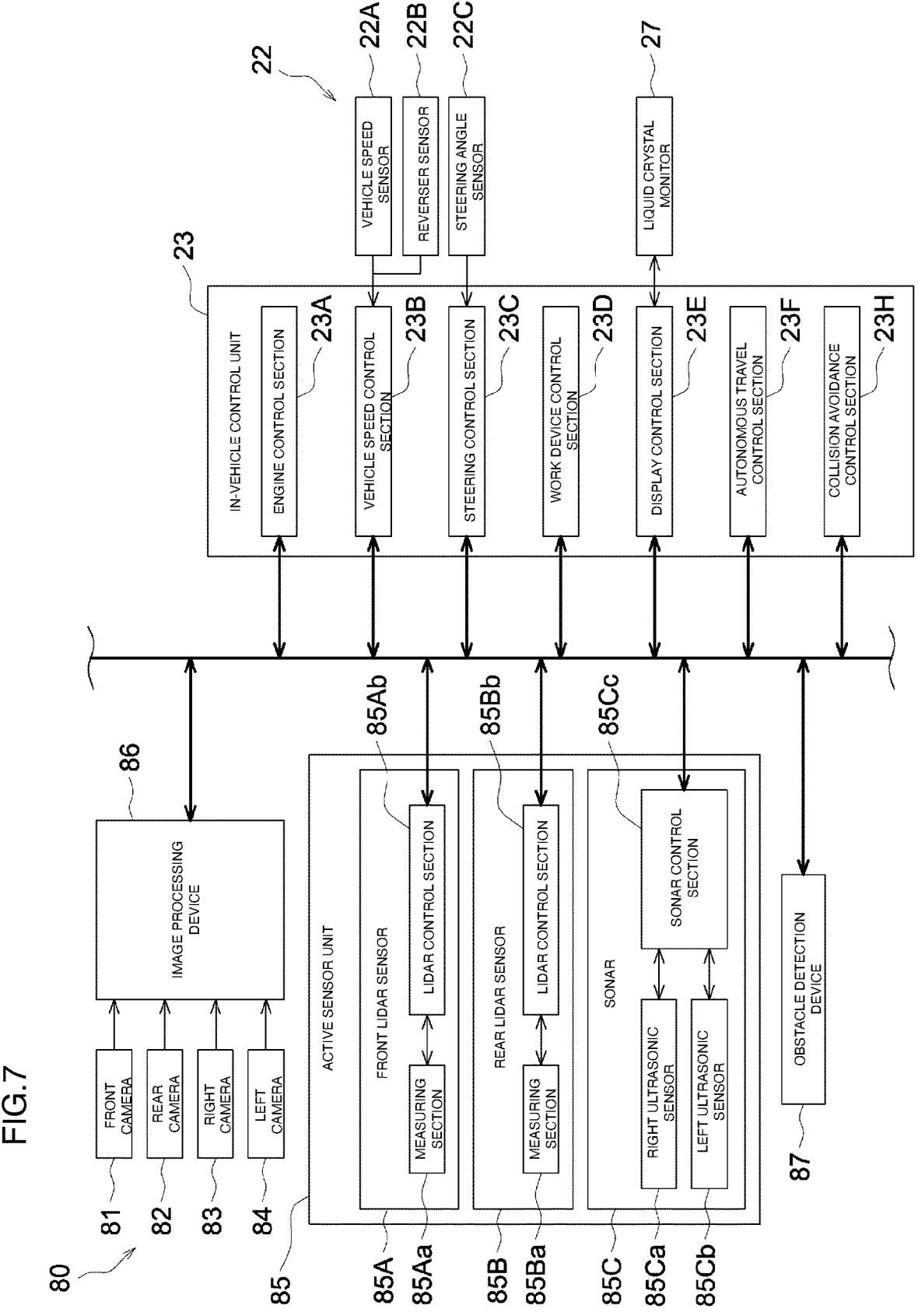
FIG. 7 is a block diagram illustrating a schematic configuration of an obstacle detection system for the work vehicle.

The vehicle state detection device 22 is a general term for various sensors and switches provided in sections of the tractor 1. As illustrated in FIG. 7, the vehicle state detection device 22 includes: a vehicle speed sensor 22A that detects a vehicle speed of the tractor 1; a reverser sensor 22B that detects an operation position of a reverser lever for forward-reverse switching; and a steering angle sensor 22C that detects steering angles of the front wheels 10. Although not illustrated, the vehicle state detection device 22 also includes: a rotation sensor that detects an output rotation speed of the engine 14; an accelerator sensor that detects the operation position of the accelerator lever; a gear shift sensor that detects an operation position of the gear shift lever; and the like.

As illustrated in FIGS. 6 to 7, the in-vehicle control unit 23 includes: an engine control section 23A that executes control related to the engine 14; a vehicle speed control section 23B that executes control related to the vehicle speed and the forward-reverse switching of the tractor 1; a steering control section 23C that executes control related to steering; a work device control section 23D that executes control related to the work device such as the rotary tiller 3; a display control section 23E that executes control related to the display and notification to the liquid crystal monitor 27 and the like; an autonomous travel control section 23F that executes control related to the autonomous travel; an in-vehicle non-volatile storage section 23G that stores a target route P (see FIG. 5) for the autonomous travel generated according to a travel area sectioned in the field; and the like. Each of the control sections 23A to 23F is constructed of an electronic control unit, in which a microcontroller and the like are integrated, various control programs, and the like. The control sections 23A to 23F are connected in a mutually communicable manner via a Controller Area Network (CAN).

For example, in-vehicle Ethernet, CAN with Flexible Data rate (CAN-FD), or the like that is a communication standard other than the CAN or a next-generation communication standard may be adopted for the mutual communication among the control sections 23A to 23F.

The engine control section 23A executes engine speed maintenance control and the like on the basis of detection information from the accelerator sensor and detection information from the rotation sensor. In the engine speed maintenance control, the engine speed is maintained at a speed that corresponds to the operation position of the accelerator lever.

The vehicle speed control section 23B executes vehicle speed control, forward-reverse switching control, and the like on the basis of detection information from the gear shift sensor, detection information from the vehicle speed sensor 22A, and the like. In the vehicle speed control, the actuation of the continuously variable transmission is controlled such that the vehicle speed of the tractor 1 is changed to a speed corresponding to the operation position of the gear shift lever. In the forward-reverse switching control, a transmission state of the forward-reverse switching device is switched on the basis of detection information from the reverser sensor 22B. The vehicle speed control includes deceleration stop processing for decelerating the continuously variable transmission to a zero-speed state so as to stop travel of the tractor 1 in the case where the gear shift lever is operated to a zero-speed position.

The work device control section 23D executes: work clutch control for controlling actuation of the work clutch unit 19 on the basis of an operation of a PTO switch and the like; lift control for controlling actuation of the lift drive unit 20 on the basis of an operation of a lift switch, a set value of a height setting dial, and the like; rolling control for controlling actuation of the rolling unit 21 on the basis of a set value of a roll angle setting dial, and the like; and the like. The PTO switch, the lift switch, the height setting dial, and the roll angle setting dial are included in the vehicle state detection device 22.

As illustrated in FIG. 6, the tractor 1 includes a positioning unit 30 that measures a current position, a current direction, and the like of the tractor 1. The positioning unit 30 has: a satellite navigation device 31 that measures the current position and the current direction of the tractor 1 by using the Global Navigation Satellite System (GNSS) as an example of a Navigation Satellite System (NSS); an inertial measurement unit (IMU) 32 that has a three-axis gyroscope, a three-direction acceleration sensor, and the like to measure a posture, a direction, and the like of the tractor 1; and the like. As positioning methods using the GNSS, Differential GNSS (DGNSS), Real Time Kinematic GNSS (RTK-GNSS), and the like are available. In the present embodiment, the RTK-GNSS, which is suited for measurement of a moving body, is adopted. Accordingly, as illustrated in FIG. 1, a reference station 6 that enables positioning by the RTK-GNSS is installed at a known location in the periphery of the field.

As illustrated in FIG. 1 and FIG. 6, the tractor 1 and the reference station 6 respectively include: GNSS antennas 33, 60 that receive a radio wave transmitted from a positioning satellite 7 (see FIG. 1); communication modules 34, 61 that enables the wireless communication of information including positioning information between the tractor 1 and the reference station 6; and the like. As a result, the satellite navigation device 31 in the positioning unit 30 can measure the current position and the current direction of the tractor 1 with a high degree of accuracy on the basis of: the positioning information that is acquired when the GNSS antenna 33 on the tractor side receives the radio wave from the positioning satellite 7; and the positioning information that is acquired when the GNSS antenna 60 on the reference station side receives the radio wave from the positioning satellite 7. In addition, due to provision of the satellite navigation device 31 and the IMU 32, the positioning unit 30 can measure the current position, the current direction, and a posture angle (a yaw angle, a roll angle, a pitch angle) of the tractor 1 with a high degree of accuracy.

In this tractor 1, the IMU 32 of the positioning unit 30, the GNSS antenna 33, and the communication module 34 are included in an antenna unit 35 illustrated in FIG. 1. The antenna unit 35 is arranged at a center in a right-left direction of an upper portion on a front surface side of the cabin 13. A mounted position of the GNSS antenna 33 on the tractor 1 corresponds to a positioning target position at the time when the current position and the like of the tractor 1 are measured by using the GNSS.

As illustrated in FIG. 6, the mobile communication terminal 5 includes: a terminal control unit 51 having an electronic control unit, in which a microcontroller and the like are integrated, various control programs, and the like; a communication module 52 that allows wireless communication of the information including the positioning information with the communication module 34 on the tractor side; and the like. The terminal control unit 51 includes: a display control section 51A that executes control related to display and notification to the display device 50 and the like; a target route generation section 51B that generates the target route P for the autonomous travel; a non-volatile terminal storage section 51C that stores the target route P generated by the target route generation section 51B and the like; and the like. The terminal storage section 51C stores, as various types of information used to generate the target route P, vehicle body information on a turning radius, a work width, and the like of the tractor 1, field information that is acquired from the above-described positioning information, and the like. The field information includes: four corner points Ap1 to Ap4 (see FIG. 5) that serve as a plurality of shape specifying points (shape specifying coordinates) in the field A when a shape, size, and the like of the field A are specified, the corner points Ap1 to Ap4 being acquired by using the GNSS when the tractor 1 travels along an outer peripheral edge of the field A; a rectangular shape specifying line AL (see FIG. 5) that is acquired by connecting those corner points Ap1 to Ap4 to specify the shape, the size, and the like of the field A; and the like.

The target route generation section 51B generates the target route P on the basis of the turning radius and the work width of the tractor 1 included in the vehicle body information, the shape and the size of the field A included in the field information, and the like. For example, as illustrated in FIG. 5, in the rectangular field A, in the case where a start point p1 and an end point p2 of the autonomous travel are set, and a work travel direction of the tractor 1 is set to a direction along a short side of the field A, the target route generation section 51B first divides the field A into a margin area A1 that is adjacent to the outer peripheral edge of the field A and a travel area A2 that is located on the inside of the margin area A1 on the basis of the above-described four corner points Ap1 to Ap4 and the rectangular shape specifying line AL.

Next, on the basis of the turning radius, the work width, and the like of the tractor 1, the target route generation section 51B generates a plurality of parallel routes P1 and a plurality of turning routes P2 in the travel area A2. The plurality of parallel routes P1 are arranged in a direction along a long side of the field A and are arranged in parallel at regular intervals corresponding to the work width. The plurality of turning routes P2 are arranged in outer edge portions on long sides of the travel area A2 and connect the plurality of parallel routes P1 in a travel order.

Then, the target route generation section 51B divides the travel area A2 into paired non-work areas A2a, each of which is set in the outer edge portion on each of the long sides of the travel area A2, and a work area A2b set between the paired non-work areas A2a, and divides each of the parallel routes P1 into a non-work route P1a included in respective one of the paired non-work areas A2a and a work route P1b included in the work area A2b. In this way, the target route generation section 51B can generate the target route P that is suited for the autonomous travel of the tractor 1 in the field A illustrated in FIG. 5.

In the field A illustrated in FIG. 5, the margin area A1 is an area that is secured between the outer peripheral edge of the field A and the travel area A2 in order to prevent the rotary tiller 3 or the like from contacting another object such as a ridge adjacent to the field A at the time when the tractor 1 travels automatically in an outer peripheral portion of the travel area A2. Each of the non-work areas A2a is a ridge turning area for the tractor 1 to turn from the current working route P1b to the next working route P1b at the ridge of the field A.

In the target route P illustrated in FIG. 5, each of the non-work routes P1a and each of the turning routes P2 are routes in each of which the tractor 1 travels automatically without performing tilling work, and each of the above-described work routes P1b is a route in which the tractor 1 travels automatically while performing the tilling work. A start point p3 of each of the work routes P1b is a work start point where the tractor 1 starts the tilling work, and an end point p4 of each of the work routes P1b is a work stop point where the tractor 1 stops the tilling work. Each of the non-work routes P1a is an alignment route for aligning the work stop point p4 before turning of the tractor 1 on the turning route P2 and the work start point p3 after turning of the tractor 1 on the turning route P2 in the work travel direction of the tractor 1. Of the connection points p5, p6 between each of the parallel routes P1 and each of the turning routes P2, the connection point p5 on an end side of each of the parallel routes P1 is a turning start point of the tractor 1, and the connection point p6 on a start side of each of the parallel routes P1 is a turning end point of the tractor 1.

The target route P illustrated in FIG. 5 is merely an example. Based on the vehicle body information that differs by a model, a work type, and the like of the tractor 1 and the field information on the shape, the size, and the like of the field A that differs by the field A, and the like, the target route generation section 51B can generate any of various target routes P suited for those.

In a state associated with vehicle body information, the field information, and the like, the target route P is stored in the terminal storage section 51C, and can be displayed on the display device 50 of the mobile communication terminal 5. The target route P includes: a target vehicle speed of the tractor 1 on each of the parallel routes P1; the target vehicle speed of the tractor 1 on each of the turning routes P2b; a front wheel steering angle on each of the parallel routes P1; the front wheel steering angle on each of the turning routes P2b; and the like.

The terminal control unit 51 transmits the field information, the target route P, and the like that are stored in the terminal storage section 51C to the in-vehicle control unit 23 in response to a transmission request command from the in-vehicle control unit 23. The in-vehicle control unit 23 stores the received field information, the received target route P, and the like in the in-vehicle storage section 23G. In regard to the transmission of the target route P, for example, the terminal control unit 51 may transmit all of the target routes P from the terminal storage section 51C to the in-vehicle control unit 23 at once at a stage before the tractor 1 starts the autonomous travel. Alternatively, the terminal control unit 51 may divide the target route P into a plurality of types of divided route information per predetermined distance. Then, at the stage before the tractor 1 starts the autonomous travel, every time a travel distance of the tractor 1 reaches the predetermined distance, the terminal control unit 51 may sequentially transmit the predetermined number of the divided route information corresponding to a travel order of the tractor 1 from the terminal storage section 51C to the in-vehicle control unit 23.

In the in-vehicle control unit 23, the autonomous travel control section 23F receives the detection information from the various sensors, the various switches, and the like included in the vehicle state detection device 22 via the vehicle speed control section 23B, the steering control section 23C, and the like. In this way, the autonomous travel control section 23F can monitor the various setting states and the operation states of the sections in the tractor 1.

In a state where a user such as the occupant or an administrator performs a manual operation to satisfy various autonomous travel start conditions and a travel mode of the tractor 1 is switched to an autonomous travel mode, when the display device 50 of the mobile communication terminal 5 is operated to command the start of the autonomous travel, the autonomous travel control section 23F starts autonomous travel control in which the tractor 1 travels automatically along the target route P while the positioning unit 30 acquires the current position, the current direction, and the like of the tractor 1.

During the autonomous travel control, for example, in the case where the user operates the display device 50 of the mobile communication terminal 5 to command termination of the autonomous travel, or in the case where the user in the driving unit 12 operates a manual operation tool such as the steering wheel 25 or the accelerator pedal, the autonomous travel control section 23F terminates the autonomous travel control and switches the travel mode from the autonomous travel mode to a manual travel mode. In the case where the autonomous travel control is restarted after the termination of the autonomous travel control, just as described, first, the user gets into the driving unit 12 and switches the travel mode of the tractor 1 from the autonomous travel mode to the manual travel mode. Next, after performing the manual operation to satisfy the various autonomous travel start conditions, the user switches the travel mode of the tractor 1 from the manual travel mode to the autonomous travel mode. Then, the autonomous travel control can be restarted by operating the display device 50 of the mobile communication terminal 5 to command the start of the autonomous travel.

The autonomous travel control by the autonomous travel control section 23F includes: engine automatic control processing for transmitting a control command for the autonomous travel related to the engine 14 to the engine control section 23A; vehicle speed automatic control processing for transmitting a control command for the autonomous travel related to the vehicle speed of the tractor 1 and the forward-reverse switching to the vehicle speed control section 23B; steering automatic control processing for transmitting a control command for the autonomous travel related to steering to the steering control section 23C; work automatic control processing for transmitting a control command for the autonomous travel related to the work device such as the rotary tiller 3 to the work device control section 23D; and the like.

In the engine automatic control processing, the autonomous travel control section 23F transmits an engine speed change command and the like to the engine control section 23A. The engine speed change command commands to change the engine speed on the basis of a set speed and the like that are included in the target route P. The engine control section 23A executes engine speed change control for automatically changing the engine speed in response to any of the various control commands that are related to the engine 14 and transmitted from the autonomous travel control section 23F.

In the vehicle speed automatic control processing, the autonomous travel control section 23F transmits, to the vehicle speed control section 23B, a gear shift operation command to command a gear shift operation of the continuously variable transmission on the basis of the target vehicle speed included in the target route P, a forward-reverse switching command to command a forward-reverse switching operation of the forward-reverse switching device on the basis of an advancing direction and the like of the tractor 1 included in the target route P, and the like. In response to the various control commands that are related to the continuously variable transmission, the forward-reverse switching device, and the like and are transmitted from the autonomous travel control section 23F, the vehicle speed control section 23B executes automatic vehicle speed control for automatically controlling the actuation of the continuously variable transmission, automatic forward-reverse switching control for automatically controlling actuation of the forward-reverse switching device, and the like. The automatic vehicle speed control includes automatic deceleration stop processing and the like. In the automatic deceleration stop processing, in the case where the target vehicle speed included in the target route P is zero, for example, deceleration control is executed to bring the continuously variable transmission into the zero-speed state, so as to stop the travel of the tractor 1.

In the steering automatic control processing, the autonomous travel control section 23F transmits, to the steering control section 23C, a steering command to command steering of the right and left front wheels 10 on the basis of the front wheel steering angle and the like included in the target route P, and the like. In response to the steering command that is transmitted from the autonomous travel control section 23F, the steering control section 23C executes: automatic steering control for controlling the actuation of the power steering unit 17 to steer the right and left front wheels 10; automatic brake turning control for actuating the brake unit 18 so as to actuate the brake on the inner side of the turn in the case where each of the right and left front wheels 10 is steered at the set angle or larger; and the like.

In the work automatic control processing, the autonomous travel control section 23F transmits, to the work device control section 23D: a work start command to command switching of the rotary tiller 3 to a work state on the basis of the work start point p3 included in the target route P; a work stop command to command switching of the rotary tiller 3 to a non-work state on the basis of the work stop point p4 included in the target route P; and the like. In response to the various control commands that are related to the rotary tiller 3 and transmitted from the autonomous travel control section 23F, the work device control section 23D executes: automatic work start control for controlling the actuation of the work clutch unit 19 and the lift drive unit 20 so as to lower and actuate the rotary tiller 3 to a work height and actuate the rotary tiller 3; automatic work stop control for stopping the rotary tiller 3 and lifting the rotary tiller 3 to a non-work height; and the like.

That is, the above-described autonomous travel unit 4 includes the power steering unit 17, the brake unit 18, the work clutch unit 19, the lift drive unit 20, the rolling unit 21, the vehicle state detection device 22, the in-vehicle control unit 23, the positioning unit 30, the communication module 34, and the like. When these units are actuated appropriately, the tractor 1 can travel automatically along the target route P with the high degree of accuracy and can appropriately perform the tillage by using the rotary tiller 3.

As illustrated in FIGS. 6 to 7, the tractor 1 includes an obstacle detection system 80 that monitors the surroundings of the tractor 1 and detects an obstacle present in the surroundings. The obstacles detected by the obstacle detection system 80 are a person such as a worker working in the field A, another work vehicle, and an existing utility pole, tree, and the like in the field A.

As illustrated in FIGS. 1 to 4 and FIGS. 6 to 7, the obstacle detection system 80 includes: four cameras (examples of an imaging device) 81 to 84, each of which captures an image of the surroundings of the tractor 1; an active sensor unit 85 that measures a distance to a measurement target object present in the surroundings of the tractor 1; an image processing device 86 that processes the image from each of the cameras 81 to 84; and an obstacle detection device 87 that performs integrated processing of the information from the image processing device 86 and the measurement information from the active sensor unit 85 to detect the obstacle. Each of the image processing device 86 and the obstacle detection device 87 is constructed of an electronic control unit, in which a microcontroller and the like are integrated, various control programs, and the like. The active sensor unit 85, the image processing device 86, and the obstacle detection device 87 are connected to the in-vehicle control unit 23 in a mutually communicable manner via the CAN.

As illustrated in FIGS. 1 to 3 and FIG. 7, the obstacle detection system 80 has, as the four cameras 81 to 84: a front camera 81, for which a first imaging range Ri1 in front of the cabin 13 is set as an imaging range; a rear camera 82, for which a second imaging range Ri2 behind the cabin 13 is set as the imaging range; a right camera 83, for which a third imaging range Ri3 to the right of the cabin 13 is set as the imaging range; and a left camera 84, for which a fourth imaging range Ri4 to the left of the cabin 13 is set as the imaging range.

The front camera 81 and the rear camera 82 are arranged on a right-left center line of the tractor 1. The front camera 81 is arranged at the center in the right-left direction of the upper portion on a front end side of the cabin 13 and has a front-down posture to look down the front of the tractor 1 from a diagonally upper side. In this way, a predetermined range on a front side of a vehicle body with the right-left center line of the tractor 1 being a symmetrical axis is set as the first imaging range Ri1 of the front camera 81. The rear camera 82 is arranged at the center in the right-left direction of the upper portion on a rear end side of the cabin 13 and has a rear-down posture to look down the rear of the tractor 1 from the diagonally upper side. In this way, a predetermined range on a rear side of the vehicle body with the right-left center line of the tractor 1 being the symmetrical axis is set as the second imaging range Ri2 of the rear camera 82. The right camera 83 is arranged at a center in a front-rear direction of the upper portion on a right end side of the cabin 13 and has a right-down posture to look down the right of the tractor 1 from the diagonally upper side. In this way, a predetermined range on a right side of the vehicle body is set as the third imaging range Ri3 of the right camera 83. The left camera 84 is arranged at the center in the front-rear direction of the upper portion on the left end side of the cabin 13 and has a left-down posture to look down the left of the tractor 1 from the diagonally upper side. In this way, a predetermined range on a left side of the vehicle body is set as the fourth imaging range Ri4 of the left camera 84.

As illustrated in FIG. 1, FIGS. 3 to 4, and FIG. 7, the active sensor unit 85 has: a front lidar sensor (an example of an active sensor) 85A, for which a first measurement range Rm1 in front of the cabin 13 is set as a measurement range; a rear lidar sensor (an example of the active sensor) 85B, for which a second measurement range Rm2 behind the cabin 13 is set as the measurement range; and a sonar (an example of the active sensor) 85C, for which a third measurement range Rm3 to the right of the cabin 13 and a fourth measurement range Rm4 to the left of the cabin 13 are set as the measurement ranges. The lidar sensors 85A, 85B respectively have: measuring sections 85Aa, 85Ba that use a laser beam (for example, a pulsed near-infrared laser beam) as an example of measurement light to perform measurement in the first measurement range Rm1 and the second measurement range Rm2, respectively; lidar control sections 85Ab, 85Bb that generate distance images and the like on the basis of the measurement information from the measuring sections 85Aa, 85Ba. The sonar 85C has a right ultrasonic sensor 85Ca, a left ultrasonic sensor 85Cb, and a single sonar control section 85Cc. Each of the lidar control sections 85Ab, 85Bb and the sonar control section 85Cc is constructed by an electronic control unit in which a micro-controller or the like is integrated, various control programs, and the like. The lidar control sections 85Ab, 85Bb and the sonar control section 85Cc are connected to the obstacle detection device 87 in the mutually communicable manner via CAN.

In the lidar sensors 85A, 85B, the measuring sections 85Aa, 85Ba each measure a distance from respective one of the measuring sections 85Aa, 85Ba to each ranging point (an example of the measurement target object) in the first measurement range Rm1 or the second measurement range Rm2 by a Time Of Flight (TOF) method for measuring the distance to the ranging point on the basis of a round-trip time from arrival of the irradiated laser beam at the ranging point to return thereof. Each of the measuring sections 85Aa, 85Ba scans the laser beam vertically and horizontally at a high speed over respective one of the entire first measurement range Rm1 and the entire second measurement range Rm2, sequentially measures the distance to the ranging point per scan angle (coordinate), and thereby performs three-dimensional measurement in respective one of the entire first measurement range Rm1 and the entire second measurement range Rm2. Each of the measuring sections 85Aa, 85Ba sequentially measures intensity of reflected light (hereinafter referred to as reflection intensity) from each of the ranging points that are acquired when scanning the laser beam vertically and horizontally at the high speed over respective one of the first measurement range Rm1 and the second measurement range Rm2. Each of the measuring sections 85Aa, 85Ba repeatedly measures the distance to each of the ranging points, the reflection intensity, and the like in real time in respective one of the first measurement range Rm1 and the second measurement range Rm2. Each of the lidar control sections 85Ab, 85Bb generates the distance image and extracts a ranging point group estimated as the obstacle from the measurement information, such as the distance to each of the ranging points and the scan angle (coordinate) for each of ranging points, measured by respective one of the measuring sections 85Aa, 85Ba. Then, each of the lidar control sections 85Ab, 85Bb transmits, as measurement information on an obstacle candidate, the measurement information on the extracted ranging point group to the obstacle detection device 87.

Each of the lidar control sections 85Ab, 85Bb determines whether a distance value of each of the ranging points measured by respective one of the measuring sections 85Aa, 85Ba meets the invalid condition, and transmits the distance value that meets the invalid condition as an invalid value to the obstacle detection device 87.

More specifically, each of the lidar control sections 85Ab, 85Bb uses a characteristic of dirt that is located on a sensor surface of respective one of the lidar sensors 85A, 85B and that exists at a close distance from respective one of the lidar sensors 85A, 85B, and sets the distance value of the ranging point having such a characteristic as the invalid value. This prevents the distance value of the ranging point related to the dirt on the sensor surface from being used as information on the obstacle in the obstacle detection device 87.

Each of the lidar control sections 85Ab, 85Bb uses a characteristic of a floating matter such as dirt or fog that exists at the close distance from respective one of the lidar sensors 85A, 85B but has the extremely low reflection intensity, and sets the distance value of the ranging point having such a characteristic as the invalid value. This prevents the distance value of the ranging point related to the floating matter from being used as the information on the obstacle in the obstacle detection device 87.

Figure 4:
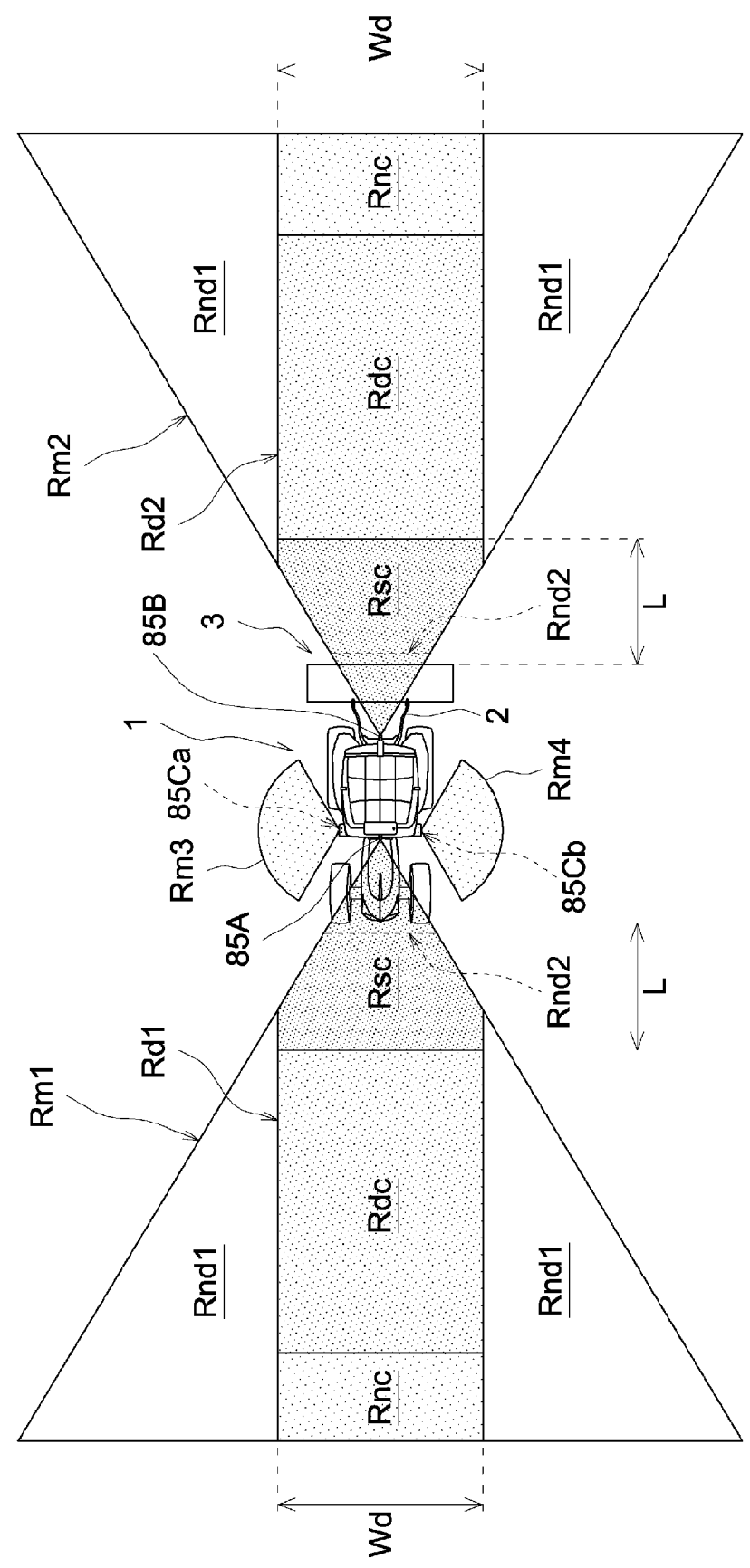
Figure 5:
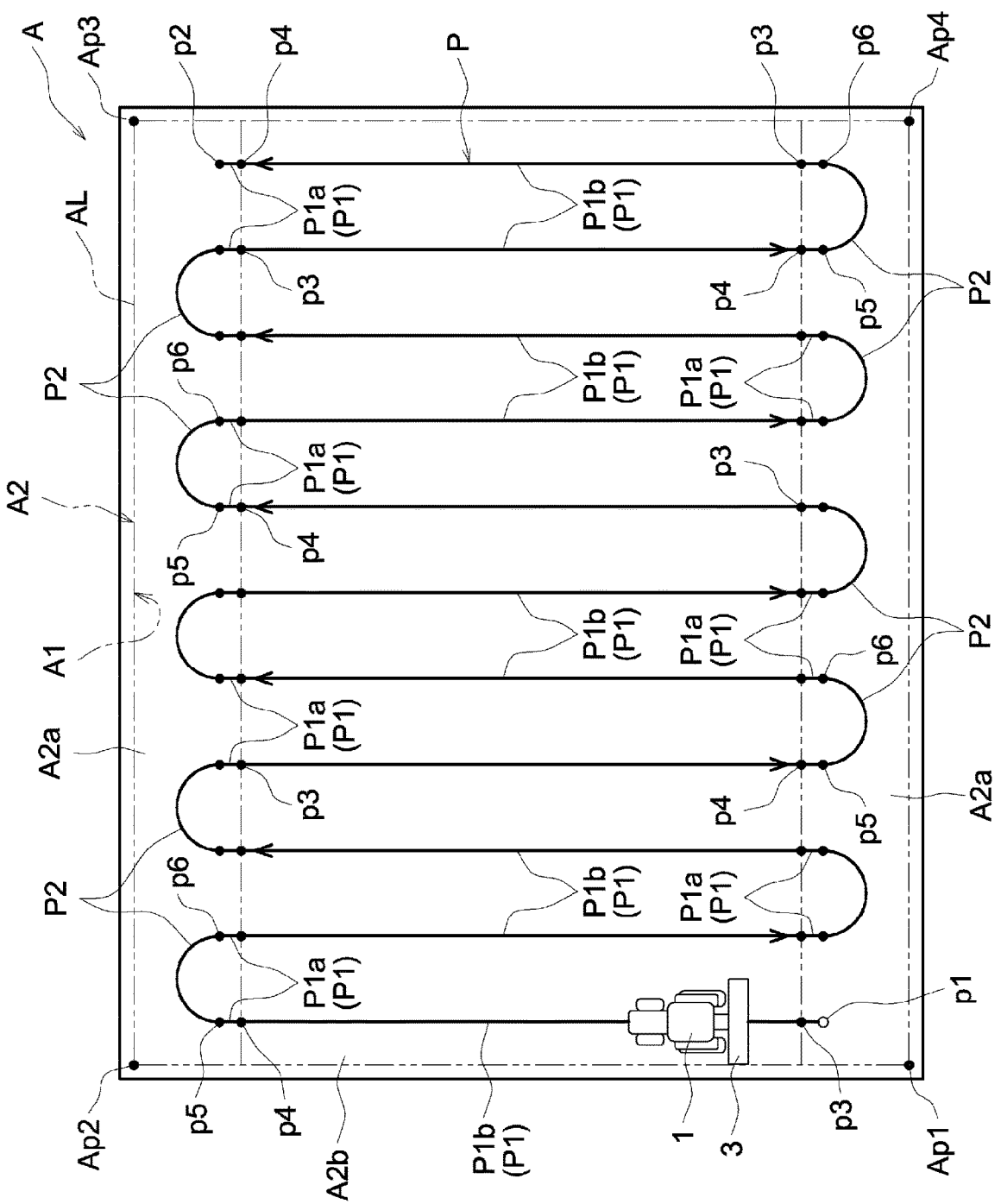
FIG. 5 is a plan view illustrating an example of a target route for autonomous travel.

As illustrated in FIG. 1 and FIGS. 3 to 4, similar to the front camera 81 and the rear camera 82, the front lidar sensor 85A and the rear lidar sensor 85B are arranged on the right-left center line of the tractor 1. The front lidar sensor 85A is arranged at the center in the right-left direction of the upper portion on the front end side of the cabin 13 and has the front-down posture to look down the front of the tractor 1 from the diagonally upper side. In this way, the front lidar sensor 85A sets a predetermined range on the front side of the vehicle body with the right-left center line of the tractor 1 being the symmetrical axis as the first measurement range Rm1 by the measuring section 85Aa. The rear lidar sensor 85B is arranged at the center in the right-left direction of the upper portion on the rear end side of the cabin 13 and has the rear-down posture to look down the rear of the tractor 1 from the diagonally upper side. In this way, the rear lidar sensor 85B sets a predetermined range on the rear side of the vehicle body with the right-left center line of the tractor 1 being the symmetrical axis as the second measurement range Rm2 by the measuring section 85Ba.

In regard to the front lidar sensor 85A and the rear lidar sensor 85B, during forward travel of the tractor 1 in which the forward-reverse switching device of the gear shift unit 16 is switched to a forward transmission state, in conjunction therewith, the front lidar sensor 85A is brought into an actuated state, and the rear lidar sensor 85B is brought into an actuation stop state. Meanwhile, during reverse travel of the tractor 1 in which the forward-reverse switching device of the gear shift unit 16 is switched to a reverse transmission state, in conjunction therewith, the front lidar sensor 85A is brought into the actuation stop state, and the rear lidar sensor 85B is brought into the actuated state.

As illustrated in FIG. 1, FIGS. 3 to 4, and FIG. 7, in the sonar 85C, the sonar control section 85Cc determines presence or absence of the measurement target object in the third measurement range Rm3 or the fourth measurement range Rm4 on the basis of transmission and reception of the ultrasonic waves by the right and left ultrasonic sensors 85Ca, 85Cb. The sonar control section 85Cc measures a distance from each of the right and left ultrasonic sensors 85Ca, 85Cb to the measurement target object by the Time Of Flight (TOF) method for measuring the distance to the ranging point on the basis of the round-trip time from arrival of the transmitted ultrasonic wave at the ranging point to return thereof, and transmits, to the obstacle detection device 87, the distance to the measurement target object that has been measured and the direction of the measurement target object as the measurement information on the obstacle candidate.

Figure 2:
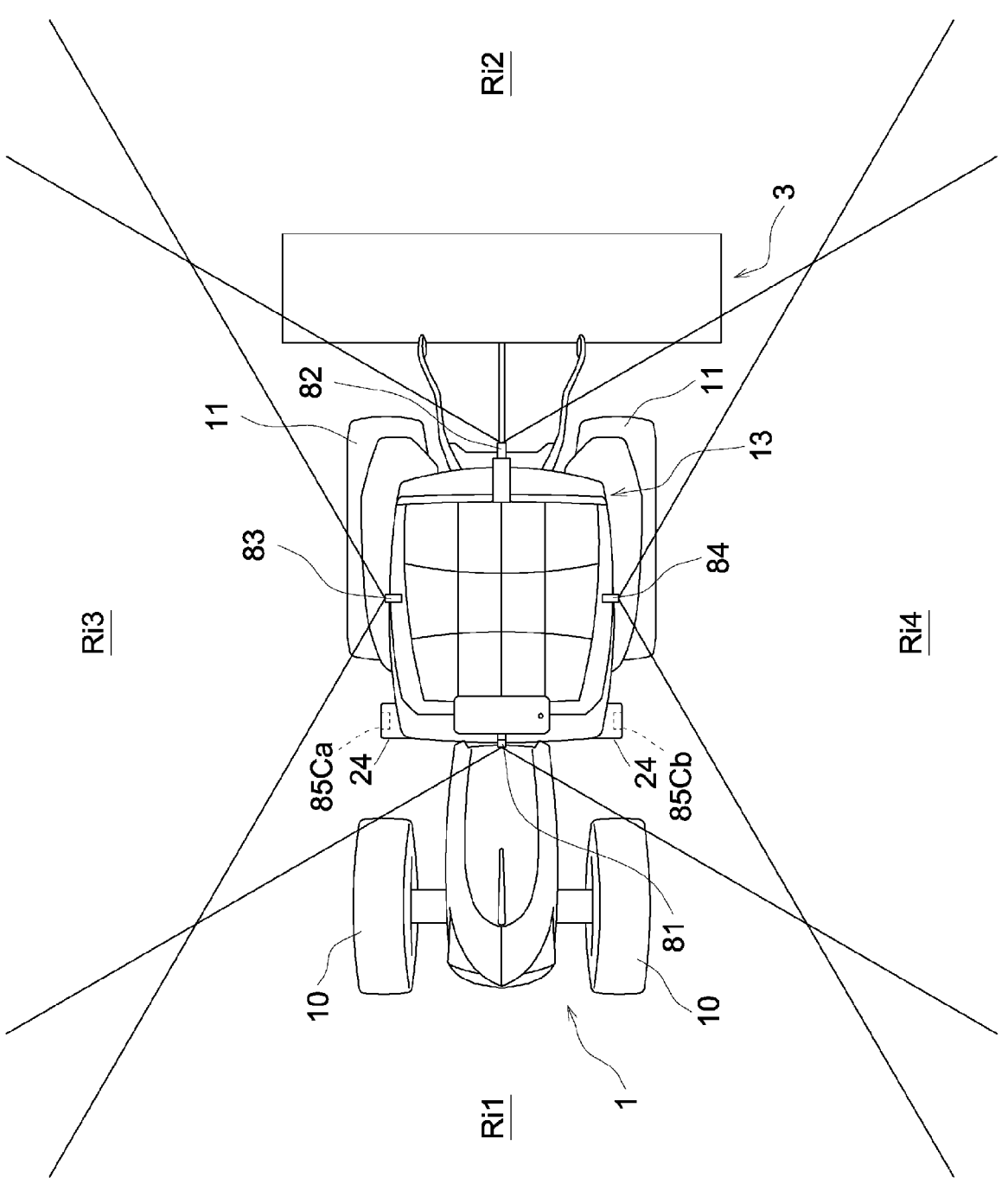
FIG. 2 is a plan view of a tractor illustrating an imaging range of each camera.

As illustrated in FIGS. 1 to 3, the right ultrasonic sensor 85Ca is attached to a getting-on/off step 24 on a right side that is arranged between the right front wheel 10 and the right rear wheel 11 and has a posture facing a right outer side of the vehicle body. Accordingly, a predetermined range on the right outer side of the vehicle body is set as the third measurement range Rm3 of the right ultrasonic sensor 85Ca. The left ultrasonic sensor 85Cb is attached to the getting-on/off step 24 on a left side that is arranged between the front wheel 10 and the rear wheel 11 on the left side and has a posture facing a left outer side of the vehicle body. Accordingly, a predetermined range on the left outer side of the vehicle body is set as the fourth measurement range Rm4 of the left ultrasonic sensor 85Cb.

Figure 8:
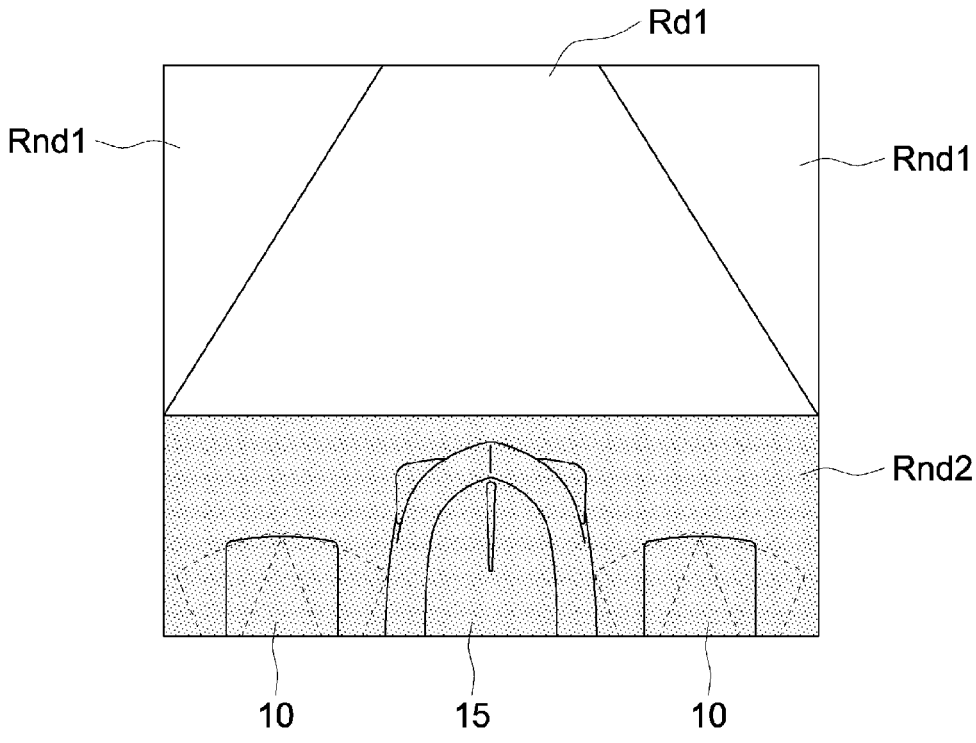
FIG. 8 is a view illustrating a detection range and a non-detection range of an obstacle in a distance image by a front lidar sensor.
Figure 9:
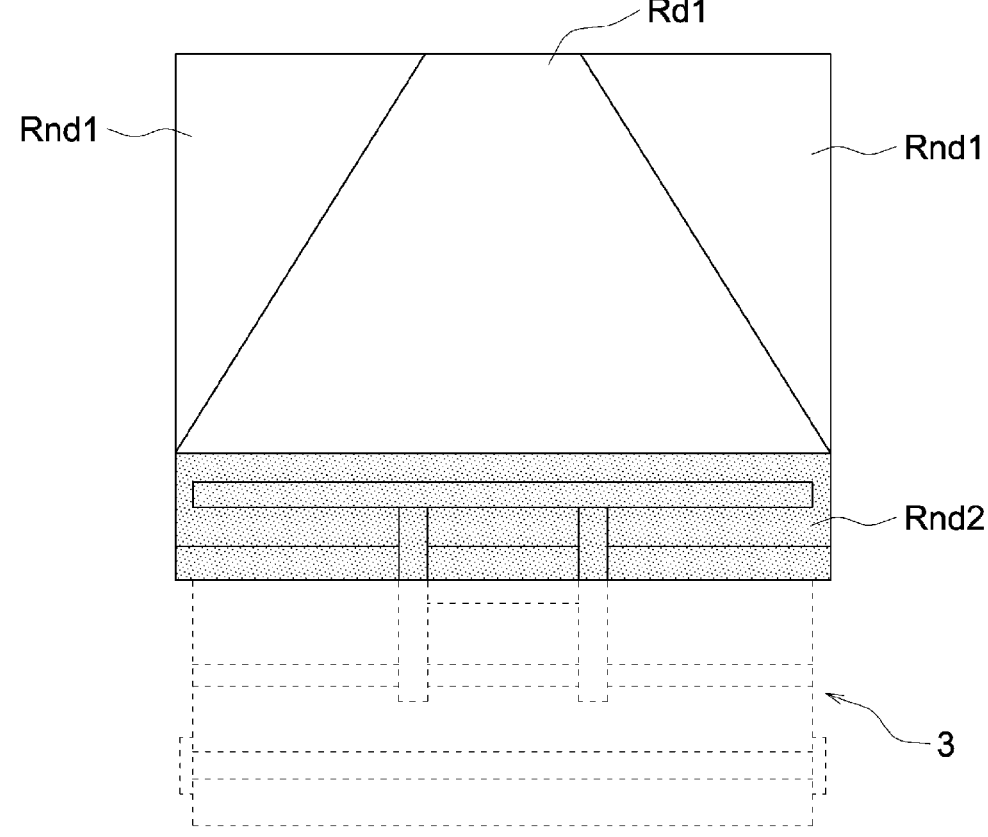
FIG. 9 is a view illustrating a detection range and a non-detection range of the obstacle in a lowered state of the work vehicle in a distance image by a rear lidar sensor.
Figure 10:
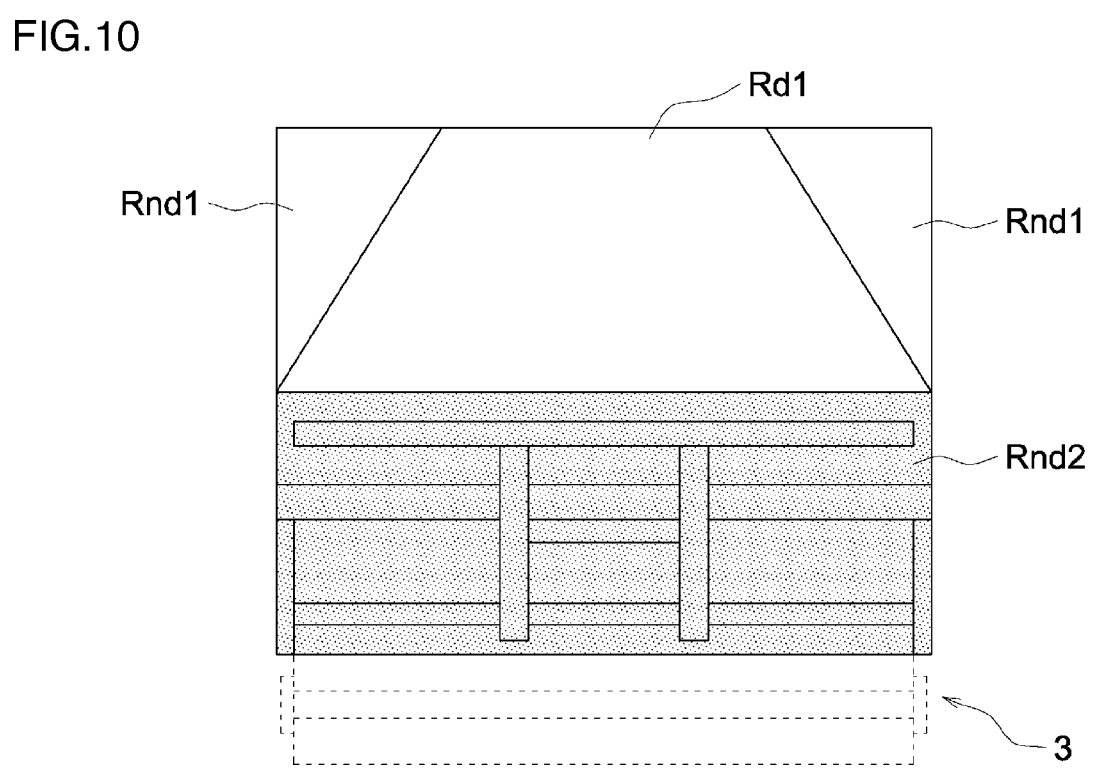

As illustrated in FIG. 4 and FIGS. 8 to 10, the lidar control sections 85Ab, 85Bb perform cut processing and masking processing, which are based on the vehicle body information and the like, for the measurement ranges Rm1, Rm2 of the measuring sections 85Aa, 85Ba, and thereby set a first detection range Rd1 and a second detection range Rd2 for the above-described obstacle candidate as a detection target, respectively. In the cut processing, the lidar control sections 85Ab, 85Bb acquire a maximum right-left width of the vehicle body including the rotary tiller 3 (a right-left width of the rotary tiller 3 in the present embodiment) by the communication with the in-vehicle control unit 23, add a predetermined safety range to this maximum right-left width of the vehicle body, and thereby set a detection target width Wd of the obstacle candidate. Then, in the first measurement range Rm1 and the second measurement range Rm2, the lidar control sections 85Ab, 85Bb set each of right and left ranges on the outside of the detection target width Wd as a first non-detection range Rnd1 by the cut processing, and eliminate the first non-detection range Rnd1 from each of the detection ranges Rd1, Rd2. In the masking processing, the lidar control sections 85Ab, 85Bb set, as a second non-detection range Rnd2 by the masking processing, a range acquired by adding a predetermined safety range to each of a range in which the front end side of the tractor 1 is located in the first measurement range Rm1 and a range in which the rear end side of the rotary tiller 3 is located in the second measurement range Rm2, and eliminates the second non-detection range Rnd2 from each of the detection ranges Rd1, Rd2. In this way, the detection target ranges of the obstacle candidate by the lidar sensors 85A, 85B are limited to the first detection range Rd1 and the second detection range Rd2. Due to such limitation, each of the lidar sensors 85A, 85B avoids an increase in a detection load caused by detection of the obstacle candidate that is out of the detection target width Wd and has no possibility of colliding the tractor 1, and avoids a possibility of erroneous detection of the front end side of the tractor 1 and the rear end side of the tractor 1 including the rotary tiller 3, which are located in the first measurement range Rm1 and the second measurement range Rm2, as the obstacle candidate. The second non-detection range Rnd2 illustrated in FIG. 8 is an example of the non-detection range suited for the front side of the vehicle body where the right and left front wheels 10 and the hood 15 are present. The second non-detection range Rnd2 illustrated in FIG. 9 is an example of the non-detection range suited for the work state in which the rotary tiller 3 on the rear side of the vehicle body is lowered to the work height. The second non-detection range Rnd2 illustrated in FIG. 10 is an example of the non-detection range suited for the non-work state in which the rotary tiller 3 on the rear side of the vehicle body is lifted to a retreat height. The second non-detection range Rnd2 on the rear side of the vehicle body is appropriately switched in an interlocking manner with lifting or lowering of the rotary tiller 3.

Information on the first detection range Rd1, the second detection range Rd2, the first non-detection range Rnd1, and the second non-detection range Rnd2 is included in the above-described distance image and, with the above-described distance image, transmitted to the obstacle detection device 87.

As illustrated in FIG. 4, on the basis of collision determination processing for which a collision prediction time is set as a set time (for example, three seconds), each of the detection ranges Rd1, Rd2 of the lidar sensors 85A, 85B is divided into: a stop control range Rsc that is set in a range from respective one of the lidar sensors 85A, 85B to a determination reference position in the collision determination processing; a deceleration control range Rdc that is set in a range from the determination reference position to a deceleration start position; and a notification control range Rnc that is set in a range from the deceleration start position to a measurement limit position of respective one of the lidar sensors 85A, 85B. The determination reference position in the first detection range Rd1 is set at a position that is away from the front end or the rear end of the vehicle body including the rotary tiller 3 in the front-rear direction of the vehicle body by a certain distance L (for example, 2000 mm).

The image processing device 86 performs image processing on the images that are sequentially transmitted from the cameras 81 to 84.

The image processing device 86 is subjected to learning processing for recognizing, as the obstacles, the person such as the worker working in the field A, the other work vehicle, and the existing utility pole, tree, and the like in the field A.

Figure 11:
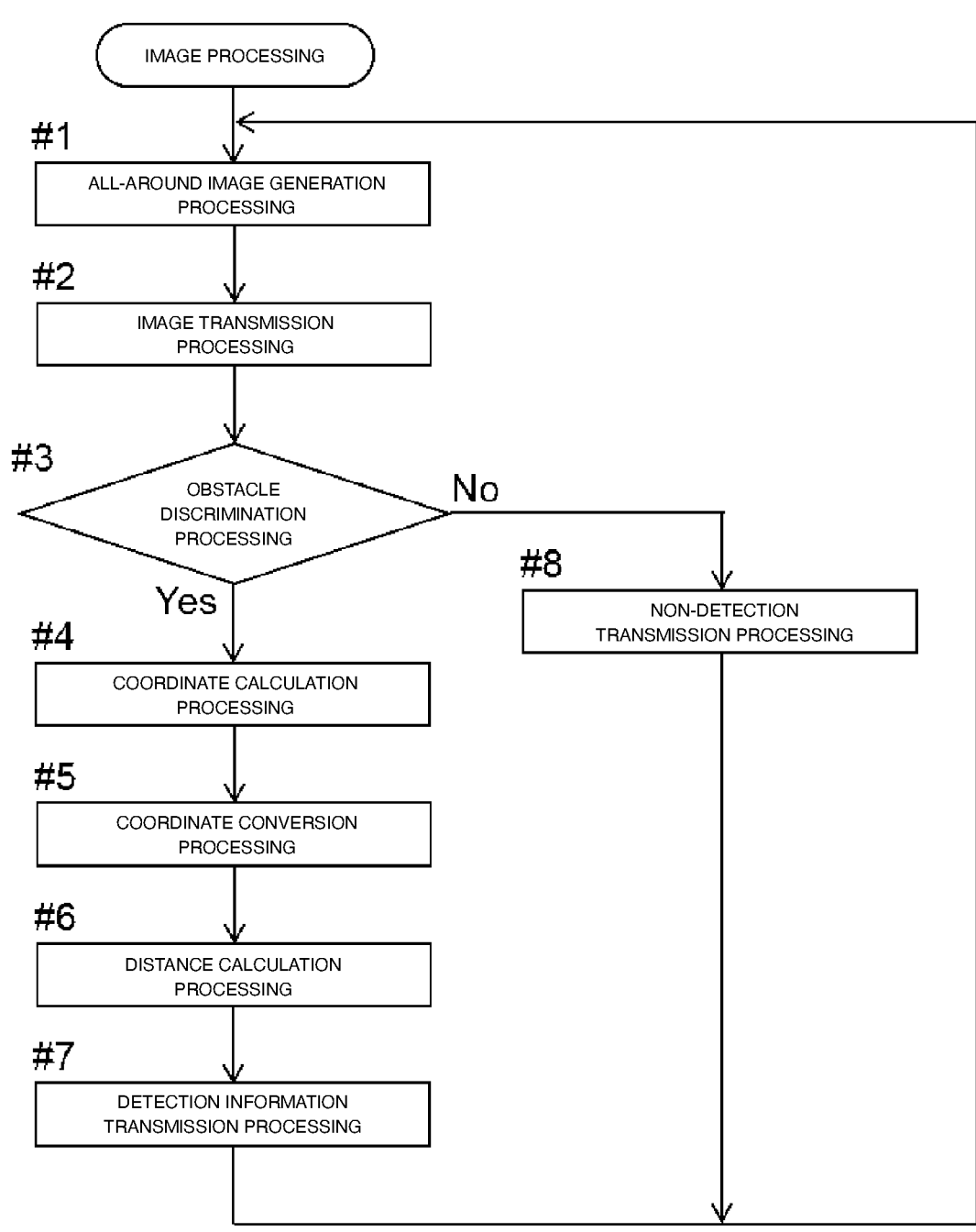
FIG. 11 is a flowchart illustrating a processing procedure by the image processing device in image processing.

A description will hereinafter be made on a processing procedure the image processing by the image processing device 86 with reference to a flowchart illustrated in FIG. 11. For the images that are sequentially transmitted from the cameras 81 to 84, the image processing device 86 first performs all-around image generation processing to synthesize the images from all the cameras 81 to 84, and generate an all-around image (for example, a surround view) of the tractor 1 (step #1). Then, the image processing device 86 performs image transmission processing to transmit the generated all-around image and the images from the cameras 81 to 84 to the display control section 23E on the tractor side and the display control section 51A on a mobile communication terminal side (step #2).

In this way, the all-around image generated by the image processing device 86, the image in the travel direction of the tractor 1, and the like can be displayed on the liquid crystal monitor 27 of the tractor 1, the display device 50 of the mobile communication terminal 5, and the like. Then, by such display, the user can visually recognize a situation in the surroundings of the tractor 1 and a situation in the travel direction.

Next, the image processing device 86 performs obstacle discrimination processing to discriminate whether the obstacle that hinders the travel of the tractor 1 exists in any of the imaging ranges Ri1 to Ri4 of the cameras 81 to 84 on the basis of the images that are sequentially transmitted from the cameras 81 to 84 (step #3). If the obstacle exists, the image processing device 86 performs coordinate calculation processing to calculate the coordinates of the obstacle on the image where the obstacle exists (step #4), and performs coordinate conversion processing to convert the calculated coordinates of the obstacle into coordinates with a vehicle body coordinate origin being a reference on the basis of mounted positions, mounted angles, and the like of the cameras 81 to 84 (step #5). Then, the image processing device 86 performs distance calculation processing to calculate a linear distance between the converted coordinates and a preset distance calculation reference point as a distance from the distance calculation reference point to the obstacle (step #6). Thereafter, the image processing device 86 performs detection information transmission processing to transmit, as detection information on the obstacle, the calculated distance from the converted coordinates to the obstacle to the obstacle detection device 87 (step #7). Thereafter, processing returns to step #1. On the other hand, if the obstacle does not exist, the image processing device 86 performs non-detection transmission processing to transmit a fact that the obstacle is been detected to the obstacle detection device 87 (step #8). Thereafter, processing returns to step #1.

Just as described, in the case where the obstacle exists in any of the imaging ranges Ri1 to Ri4 of the cameras 81 to 84, the image processing device 86 transmits the detection information of the obstacle to the obstacle detection device 87. Accordingly, when receiving the detection information of the obstacle, the obstacle detection device 87 can detect that the obstacle exists in any of the imaging ranges Ri1 to Ri4 of the cameras 81 to 84, and can detect a position of the obstacle and the distance to the obstacle. On the other hand, in the case where the obstacle does not exist in any of the imaging ranges Ri1 to Ri4 of the cameras 81 to 84, the image processing device 86 transmits the non-detection of the obstacle to the obstacle detection device 87. Thus, the obstacle detection device 87 can detect that the obstacle does not exist in any of the imaging ranges Ri1 to Ri4 of the cameras 81 to 84.

Figure 12:
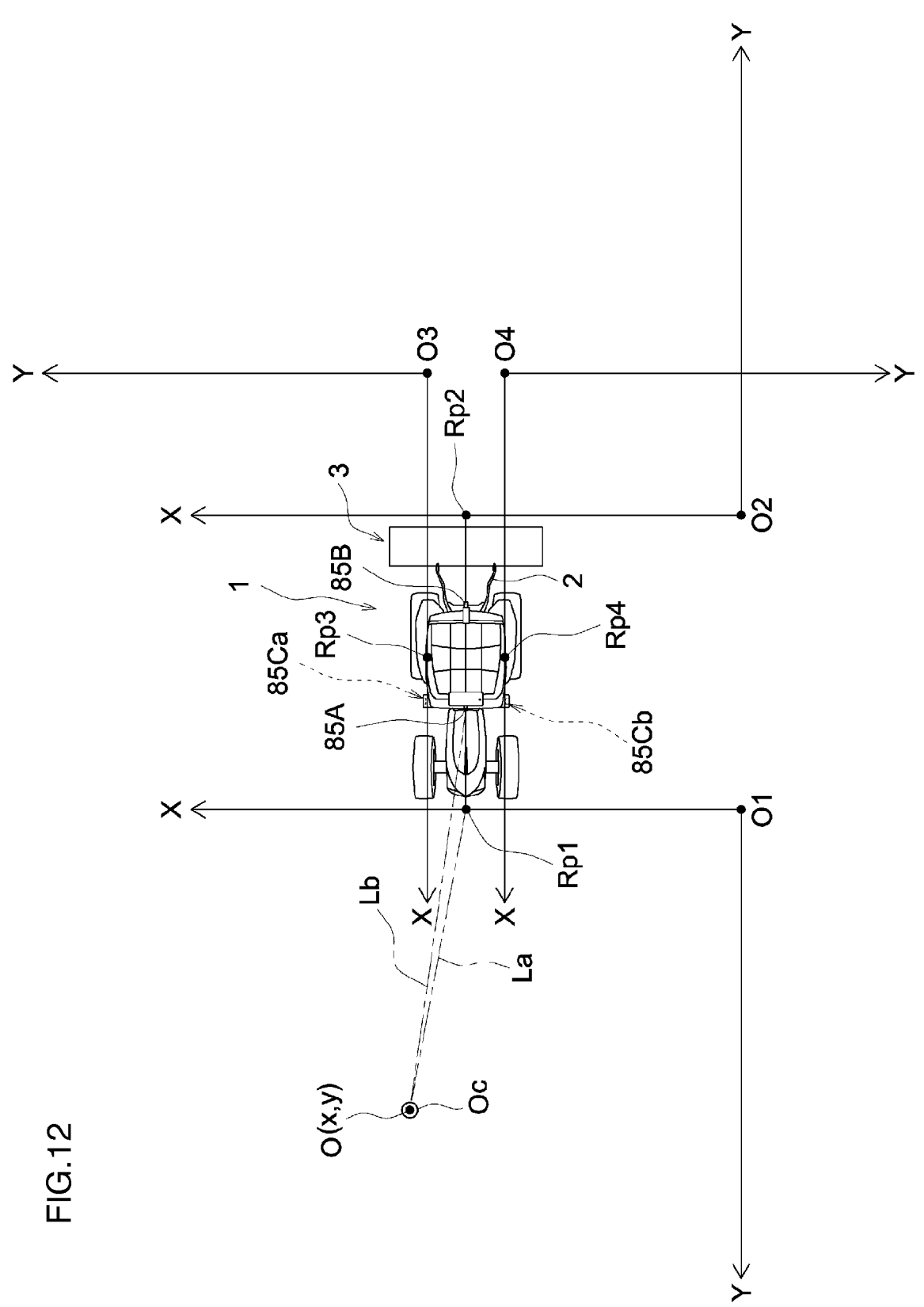

The vehicle body coordinate origin in the above coordinate conversion processing and the distance calculation reference point in the distance calculation processing are set according to the mounted positions of the cameras 81 to 84. More specifically, as illustrated in FIG. 12, a vehicle body coordinate origin O1 and a distance calculation reference point Rp1 are set for the front camera 81 according to the mounted position thereof. A vehicle body coordinate origin O2 and a distance calculation reference point Rp2 are set for the rear camera 82 according to the mounted position thereof. A vehicle body coordinate origin O3 and a distance calculation reference point Rp3 are set for the right camera 83 according to the mounted position thereof. A vehicle body coordinate origin O4 and a distance calculation reference point Rp4 are set for the left camera 84 according to the mounted position thereof.

Accordingly, for example, in the case where the obstacle exists in the first imaging range Ri1 of the front camera 81, the image processing device 86 calculates the coordinates of the obstacle on the image of the front camera 81 in which the obstacle exists (the coordinate calculation processing), converts the calculated coordinates of the obstacle into coordinates (x, y) with the vehicle body coordinate origin O1 illustrated in FIG. 12 being a reference on the basis of the mounted position, the mounted angle, and the like of the front camera 81 (the coordinate conversion processing), and calculates a linear distance from the converted coordinates (x, y) the distance calculation reference point Rp1 as a distance La from the distance calculation reference point Rp1 to an obstacle O (the distance calculation processing). Settings of relationships among the vehicle body coordinate origins O1 to O4, the distance calculation reference points Rp1 to Rp4, and the mounted positions of the cameras 81 to 84 described above can be changed in various ways.

Figure 13:
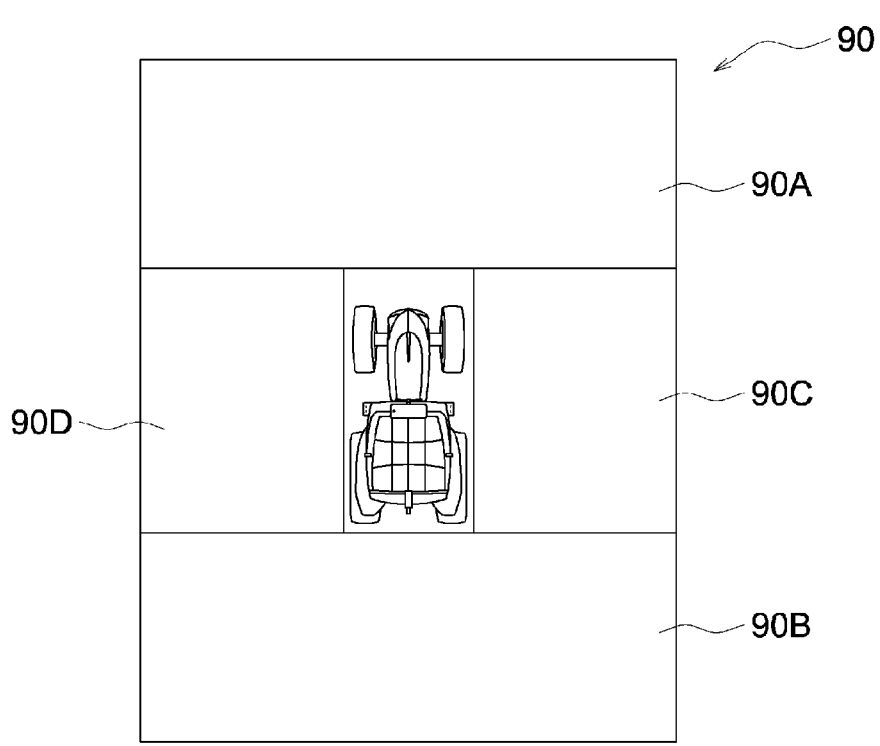
FIG. 13 is a view illustrating an example of arrangement of the camera image on a liquid crystal monitor or a display device.

By the way, in the above-described all-around image generation processing, for example, it is considered that the image processing device 86 places a processed image, which is acquired by cutting out predetermined area from the image by the front camera 81, in a front image display area 90A of an all-around image display area 90 in the liquid crystal monitor 27, the display device 50, or the like illustrated in FIG. 13, places a processed image, which is acquired by cutting out a predetermined area from the image by the rear camera 82, in a rear image display area 90B thereof, places a processed image, which is acquired by cutting out a predetermined area from the image by the right camera 83, in a right image display area 90C thereof, and places a processed image, which is acquired by cutting out a predetermined area from the image by the left camera 84, in a left image display area 90D thereof, so as to generate the all-around image, and the like.

In the above-described obstacle discrimination processing, the image processing device 86 discriminates the presence or the absence of the obstacle at an ultra-high speed of several tens of frames (for example, 30 frames) per second in each of the images that are sequentially transmitted from the cameras 81 to 84. The image processing device 86 performs the obstacle discrimination processing for each of the cameras 81 to 84 by a time division system. The image processing device 86 changes a processing target cycle per unit time for each of the cameras 81 to 84 by the time division system according to the travel direction and the vehicle speed of the tractor 1.

More specifically, in the case where the travel direction of the tractor 1 is a forward straight direction and the vehicle speed is a standard speed (for example, 10 km/h), the image processing device 86 changes the processing target cycle per unit time to the processing target cycle for standard forward straight travel set such that, for example, as illustrated in FIG. 14(*a*), the image processing is performed in succession for four frames of the front image from the front camera 81 as the processing target and then the image processing is performed for a single frame of the right image from the right camera 83 or the left image from the left camera 84 as the processing target. In the case where the travel direction of the tractor 1 is a reverse straight direction and the vehicle speed is the standard speed, the image processing device 86 changes the processing target cycle per unit time to the processing target cycle for standard reverse straight travel set such that, for example, as illustrated in FIG. 14(*b*), the image processing is performed in succession for four frames of the rear image from the rear camera 82 as the processing target and then the image processing is performed for the single frame of the right image from the right camera 83 or the left image from the left camera 84 as the processing target.

In the case where the travel direction of the tractor 1 is a forward right turn direction and the vehicle speed is the standard speed, the image processing device 86 changes the processing target cycle per unit time to the processing target cycle for a standard forward right turn set such that, for example, as illustrated in FIG. 14(*c*), the image processing is performed in succession for three frames of the front image from the front camera 81 as the processing target and then either the image processing is performed in succession for two frames of the right image from the right camera 83 or the image processing on the right image from the right camera 83 as the processing target and the image processing on the left image from the left camera 84 as the processing target are performed for single fame each.

In the case where the travel direction of the tractor 1 is a forward left turn direction and the vehicle speed is the standard speed, the image processing device 86 changes the processing target cycle per unit time to the processing target cycle for a standard forward left turn set such that, for example, as illustrated in FIG. 14(*d*), the image processing is performed in succession for three frames of the front image from the front camera 81 as the processing target and then either the image processing is performed in succession for two frames of the left image from the left camera 84 or the image processing on the right image from the right camera 83 as the processing target and the image processing on the left image from the left camera 84 as the processing target are performed for single fame each.

In the case where the travel direction of the tractor 1 is the forward straight direction and the vehicle speed is lower than the standard speed, the image processing device 86 changes the processing target cycle per unit time to the processing target cycle for low-speed forward straight travel set such that, for example, as illustrated in FIG. 14(*e*), the image processing is performed in succession for three frames of the front image from the front camera 81 as the processing target and then the image processing is performed for the single frame of the right image from the right camera 83 or the left image from the left camera 84 as the processing target.

In the case where the travel direction of the tractor 1 is the forward straight direction and the vehicle speed is higher than the standard speed, the image processing device 86 changes the processing target cycle per unit time to the processing target cycle for high-speed forward straight travel set such that, for example, as illustrated in FIG. 14(*f*), the image processing is performed in succession for five frames of the front image from the front camera 81 as the processing target and then the image processing is performed for the single frame of the right image from the right camera 83 or the left image from the left camera 84 as the processing target.

As described above, when the image processing device 86 performs the obstacle discrimination processing by the time division system, it is possible to promptly and sequentially perform the obstacle discrimination processing, a processing load of which is large, for the images from the cameras 81 to 84 by the single image processing device 86 without delay.

In addition, according to switching of the forward/reverse travel of the tractor 1, the image processing device 86 switches between the state where one of the front image and the rear image is set as the processed target and the state where one of the front image and the rear image is not set as the processed target. In this way, a reduction in a processing speed that is caused by performing unnecessary image processing is avoided.

Then, according to the travel direction of the tractor 1, the image processing device 86 hastens the processing target cycle per unit time for each of the cameras 81 to 84 having the travel direction of the tractor 1 as the imaging range, and slows the processing target cycle per unit time for each of the cameras 81 to 84 not having the travel direction of the tractor 1 as the imaging range. In this way, while the single image processing device 86 promptly performs the obstacle discrimination processing on the images from the cameras 81 to 84 without delay, it is possible to focus on discrimination of the presence or the absence of the obstacle in the travel direction of the tractor 1. As a result, the collision with the obstacle can easily be avoided.

Furthermore, as the vehicle speed of the tractor 1 is increased, the image processing device 86 hastens the processing target cycle per unit time for each of the cameras 81 to 84 having the travel direction of the tractor 1 as the imaging range, and slows the processing target cycle per unit time for each of the cameras 81 to 84 not having the travel direction of the tractor 1 as the imaging range.

Furthermore, as the vehicle speed of the tractor 1 is increased, the image processing device 86 hastens the processing target cycle per unit time for each of the cameras 81 to 84 having the travel direction of the tractor 1 as the imaging range, and slows the processing target cycle per unit time for each of the cameras 81 to 84 not having the travel direction of the tractor 1 as the imaging range. In this way, while the single image processing device 86 promptly performs the obstacle discrimination processing on the images from the cameras 81 to 84 without delay, it is possible to focus more on the discrimination of the presence or the absence of the obstacle in the travel direction of the tractor 1 with the increase in the vehicle speed of the tractor 1. As a result, the collision with the obstacle can easily be avoided.

The above-described processing target cycle per unit time for each of the cameras 81 to 84 is merely one example, and various changes can be made thereto according to a work type, a field condition, or the like.

In addition, as illustrated in FIG. 7, the image processing device 86 acquires the vehicle speed of the tractor 1, which is detected by the vehicle speed sensor 22A, via the vehicle speed control section 23B. The image processing device 86 discriminates the travel direction of the tractor 1 on the basis of the operation position of the reverser lever acquired via the vehicle speed control section 23B and the steering angles of the front wheels 10 acquired via the steering control section 23C.

The obstacle detection device 87 executes first identification control for identifying the position of the obstacle and the distance to the obstacle in the first imaging range Ri1 when detecting that the presence of the obstacle in the first imaging range Ri1 of the front camera 81 is detected on the basis of the detection information on the obstacle from the image processing device 86 during the forward travel of the tractor 1.

A description will hereinafter be made on control actuation of the obstacle detection device 87 in the first identification control with reference to a flowchart illustrated in FIG. 15.

The obstacle detection device 87 performs first position determination processing to determine whether the obstacle is located in the first detection range Rd1 of the front lidar sensor 85A on the basis of the coordinates of the obstacle and the distance to the obstacle included in the detection information on the obstacle from the image processing device 86 (step #11). If the obstacle is located in the first detection range Rd1, the obstacle detection device 87 performs second position determination processing to determine whether the obstacle is located in the notification control range Rnc of the first detection range Rd1 (step #12). If the obstacle is located in the notification control range Rnc, the obstacle detection device 87 performs first distance transmission processing to transmit the distance to the obstacle, which is acquired from the image processing device 86, to the in-vehicle control unit 23 (step #13), and then the processing returns to step #11. If the obstacle is not located in the notification control range Rnc, the obstacle is located in the deceleration control range Rdc or the stop control range Rsc of the first detection range Rd1. Accordingly, the obstacle detection device 87 performs matching determination processing to determine whether the position of the obstacle O matches a position of an obstacle candidate Oc on the basis of; the coordinates (x, y) of the obstacle O and the distance La to the obstacle O that are included in the detection information on the obstacle from the image processing device 86 and illustrated in FIG. 12; coordinates (a scan angle) of the obstacle candidate Oc and a distance Lb to the obstacle candidate Oc that are included in the measurement information on the obstacle candidate (the ranging point group) from the front lidar sensor 85A and illustrated in FIG. 12; and the like (step #14). In a case of matching, the obstacle detection device 87 performs second distance transmission processing to transmit the distance to the obstacle, which is acquired from the front lidar sensor 85A with high distance measurement accuracy, to the in-vehicle control unit 23 (step #15), and then the processing returns to step #11. In a case of non-matching, the obstacle detection device 87 determines that the measurement information on the obstacle candidate from the front lidar sensor 85A is not the measurement information on the obstacle, and performs third distance transmission processing to transmit the distance to the obstacle, which is acquired from the image processing device 86, to the in-vehicle control unit 23 (step #16), and then the processing returns to step #11. If the obstacle is not located in the first detection range Rd1 in the first position determination processing in step #11, the obstacle detection device 87 performs object detection determination processing to determine whether the presence of the obstacle is detected in the first imaging range Ri1 of the front camera 81 (step #17). If the presence of the obstacle is detected, the processing returns to step #11, and the first identification control is continued. If the presence of the obstacle is not detected, the first identification control is terminated.

During the reverse travel of the tractor 1, the obstacle detection device 87 executes second identification control for identifying the position of the obstacle and the distance to the obstacle in the second imaging range Ri2 when detecting that the presence of the obstacle in the second imaging range Ri2 of the rear camera 82 is detected on the basis of the detection information on the obstacle from the image processing device 86.

Control contents of the second identification control are the same as those of the first identification control except that the first detection range Rd1 of the front lidar sensor 85A in the first identification control described above is changed to the second detection range Rd2 of the rear lidar sensor 85B. Thus, a description on the second identification control will not be made.

Regardless of the forward/reverse travel of the tractor 1, the obstacle detection device 87 executes third identification control for identifying the position of the obstacle and the distance to the obstacle in the third imaging range Ri3 when detecting that the presence of the obstacle is detected in the third imaging range Ri3 of the right camera 83 on the basis of the detection information on the obstacle from the image processing device 86.

A description will hereinafter be made on control actuation of the obstacle detection device 87 in the third identification control with reference to a flowchart illustrated in FIG. 16.

The obstacle detection device 87 performs third position determination processing to determine whether the obstacle is located in the third measurement range Rm3 of the sonar 85C on the basis of the coordinates of the obstacle and the distance to the obstacle included in the detection information on the obstacle from the image processing device 86 (step #21). If the obstacle is located in the third measurement range Rm3, the obstacle detection device 87 performs the matching determination processing to determine whether the position of the obstacle matches a position of the obstacle candidate on the basis of the coordinates of the obstacle and the distance to the obstacle included in the detection information on the obstacle from the image processing device 86, the distance to the obstacle candidate and a direction of the obstacle candidate included in the measurement information on the obstacle candidate from the sonar 85C, and the like (step #22). In a case of matching, the obstacle detection device 87 performs fourth distance transmission processing to transmit the distance to the obstacle candidate, which is acquired from the sonar 85C with the high distance measurement accuracy, as the distance to the obstacle to the in-vehicle control unit 23 (step #23), and then the processing returns to step #21. In a case of non-matching, the obstacle detection device 87 determines that the measurement information on the obstacle candidate from the sonar 85C is not the measurement information on the obstacle, and performs fifth distance transmission processing to transmit the distance to the obstacle, which is acquired from the image processing device 86, to the in-vehicle control unit 23 (step #24), and then the processing returns to step #21. If the obstacle is not located in the third measurement range Rm3 in the third position determination processing in step #21, the obstacle detection device 87 performs the object detection determination processing to determine whether the presence of the obstacle is detected in the third imaging range Ri3 of the right camera 83 (step #25). If the presence of the obstacle is detected, the processing returns to step #21, and the third identification control is continued. If the presence of the obstacle is not detected, the third identification control is terminated.

Regardless of the forward/reverse travel of the tractor 1, the obstacle detection device 87 executes fourth identification control for identifying the position of the obstacle and the distance to the obstacle in the fourth imaging range Ri4 when detecting that the presence of the obstacle is detected in the fourth imaging range Ri4 of the left camera 84 on the basis of the detection information on the obstacle from the image processing device 86.

Control contents of the fourth identification control are the same as those of the third identification control except that the third measurement range Rm3 of the sonar 85C is changed to the fourth measurement range Rm4. Thus, a description on the fourth identification control will not be made.

In the case where the obstacle detection device 87 detects that the presence of the obstacle is not detected in the imaging ranges Ri1 to Ri4 of the cameras 81 to 84 on the basis of the detection information on the obstacle from the image processing device 86, the obstacle detection device 87 performs measurement information invalidation processing to invalidate the measurement information from the active sensor unit 85.

As it has been described so far, only in the case where the position of the obstacle, which is discriminated by the image processing device 86 with the high object discrimination accuracy, matches the position of the obstacle candidate, which is discriminated by the active sensor unit 85, the obstacle detection device 87 adopts, as the distance to the obstacle, the distance to the obstacle candidate acquired from the active sensor unit 85 with the high distance measurement accuracy. Thus, it is possible to avoid a possibility that the distance to the obstacle candidate at the time when the active sensor unit 85 erroneously discriminates the obstacle candidate is adopted as the distance to the obstacle. As a result, the obstacle detection device 87 can acquire the detection information on the obstacle with the high object discrimination accuracy and the high distance measurement accuracy.

In addition, the obstacle detection device 87 acquires detection information on the obstacle from the image processing device 86 that performs the obstacle discrimination processing based on the camera image with the high degree of accuracy. Thus, for example, in the case where the tall grass or the like exists in each of the measurement ranges Rm1 to Rm4 of the active sensor unit 85, it is possible to avoid the possibility that the tall grass or the like is erroneously detected as the obstacle that hinders the travel of the tractor 1. Furthermore, in the detection ranges Rd1, Rd2 of the lidar sensors 85A, 85B, due to stirring up of the dirt, the dust, or the like as the floating matter, in the case where the distance values to all the ranging points in the detection ranges Rd1, Rd2 measured by the active sensor unit 85 become the invalid values, or in the case where abnormality such as the dirt on the sensor surface occurs to the active sensor unit 85, it is possible to detect the presence of the obstacle and the distance to the obstacle on the basis of the detection information on the obstacle from the image processing device 86.

As illustrated in FIGS. 6 to 7, the in-vehicle control unit 23 includes a collision avoidance control section 2311 that executes collision avoidance control for avoiding the collision with the obstacle on the basis of the detection information from the obstacle detection device 87. The collision avoidance control section 2311 is constructed of an electronic control unit, in which a microcontroller and the like are integrated, various control programs, and the like. The collision avoidance control section 2311 is connected to the other control sections 23A to 23F of the in-vehicle control unit 23, the active sensor unit 85, the image processing device 86, and the obstacle detection device 87 in the mutually communicable manner via the Controller Area Network (CAN).

A description will hereinafter be made on the collision avoidance control by the collision avoidance control section 2311. In the case where the collision avoidance control section 2311 acquires the distance to the obstacle by the first distance transmission processing from the obstacle detection device 87, the obstacle is located in the notification control range Rnc of the first detection range Rd1 or the second detection range Rd2 illustrated in FIG. 4. Accordingly, the collision avoidance control section 2311 commands the display control section 23E of the in-vehicle control unit 23 and the display control section 51A of the terminal control unit 51 to execute first notification control for notifying of the presence of the obstacle in the notification control range Rnc. In this way, the first notification control is executed in each of the display control sections 23E, 51A. As a result, it is possible to notify the user, such as the occupant in the driving unit 12 or the administrator on the outside of the vehicle, of the presence of the obstacle in the notification control range Rnc of the first detection range Rd1 or the second detection range Rd2 for the tractor 1.

In the case where the collision avoidance control section 2311 acquires the distance to the obstacle by the second distance transmission processing or the third distance transmission processing from the obstacle detection device 87, the obstacle is located in the deceleration control range Rdc or the stop control range Rsc of the first detection range Rd1 or the second detection range Rd2 illustrated in FIG. 4. Accordingly, the collision avoidance control section 2311 determines whether the position of the obstacle is in the deceleration control range Rdc or the stop control range Rsc on the basis of the acquired distance to the obstacle.

In the case where it is determined that the obstacle is located in the deceleration control range Rdc, the collision avoidance control section 2311 commands each of the display control sections 23E, 51A to execute second notification control for notifying of the presence of the obstacle in the deceleration control range Rdc, and commands the vehicle speed control section 23B to execute automatic deceleration control. In this way, the second notification control is executed in each of the display control sections 23E, 51A. As a result, it is possible to notify the user of the presence of the obstacle in the deceleration control range Rdc of the first detection range Rd1 or the second detection range Rd2 for the tractor 1. In addition, the vehicle speed control section 23B executes the automatic deceleration control. As a result, the vehicle speed of the tractor 1 is reduced with a reduction in a relative distance to the obstacle.

In the case where it is determined that the obstacle is located in the stop control range Rsc of the first detection range Rd1 or the second detection range Rd2, the collision avoidance control section 81b performs third notification initiation command processing to command each of the display control sections 23E, 51A to execute third notification control for notifying of the presence of the obstacle in the stop control range Rsc, and commands the vehicle speed control section 23B to execute automatic stop control. In this way, the third notification control is executed in each of the display control sections 23E, 51A. As a result, it is possible to notify the user of the presence of the obstacle in the stop control range Rsc of the first detection range Rd1 or the second detection range Rd2 for the tractor 1. In addition, the vehicle speed control section 23B executes automatic stop control, and the tractor 1 is stopped at a stage where the obstacle exists in the stop control range Rsc. As a result, the collision of the tractor 1 with the obstacle can be avoided.

In the case where the collision avoidance control section 2311 acquires the distance to the obstacle by the fourth distance transmission processing or the fifth distance transmission processing from the obstacle detection device 87, the obstacle is located in the third measurement range Rm3 or the fourth measurement range Rm4 illustrated in FIG. 4. Accordingly, the collision avoidance control section 2311 commands each of the display control sections 23E, 51A to execute fourth notification control for notifying of the presence of the obstacle in the third measurement range Rm3 or the fourth measurement range Rm4. In this way, the fourth notification control is executed in each of the display control sections 23E, 51A. As a result, it is possible to notify the user of the presence of the obstacle in the third measurement range Rm3 or the fourth measurement range Rm4 for the tractor 1. In addition, the vehicle speed control section 23B executes automatic stop control, and the tractor 1 is stopped at a stage where the obstacle exists in the third measurement range Rm3 or the fourth measurement range Rm4. As a result, the collision of the tractor 1 with the obstacle can be avoided.

As it has been described so far, in the case where the obstacle is located in the deceleration control range Rdc or the stop control range Rsc in one of the detection ranges Rd1, Rd2 of the lidar sensors 85A, 85B or is located in the third measurement range Rm3 or the fourth measurement range Rm4 of the sonar 85C, the collision with the obstacle is avoided by the automatic deceleration control or the automatic stop control that is executed by the vehicle speed control section 23B on the basis of the collision avoidance control by the collision avoidance control section 2311.

Accordingly, in the case where it is detected, on the basis of the detection information on the obstacle from the image processing device 86, that the obstacle is located in the deceleration control range Rdc, the stop control range Rsc, the third measurement range Rm3, or the fourth measurement range Rm4 described above, the obstacle detection device 87 executes the above-described matching determination processing. Then, in the case where the position of the obstacle, which is discriminated by the image processing device 86, matches the position of the obstacle candidate, which is discriminated by the active sensor unit 85, the obstacle detection device 87 sets the distance to the obstacle candidate, which is measured by the active sensor unit 85 with the high distance measurement accuracy, as the distance to the obstacle, and transmits this distance to the collision avoidance control section 2311. In this way, based on the distance to the obstacle, which is measured by the active sensor unit 85 with the high distance measurement accuracy, the collision with the obstacle is avoided by the automatic deceleration control or the automatic stop control executed by the vehicle speed control section 23B on the basis of the collision avoidance control by the collision avoidance control section 2311. As a result, the collision with the obstacle can be avoided with the high degree of accuracy. In addition, in the case where the obstacle is located in the notification control range Rnc of one of the detection ranges Rd1, Rd2 of the lidar sensors 85A, 85B, the collision with the obstacle is not avoided by the automatic deceleration control or the automatic stop control executed by the vehicle speed control section 23B on the basis of the collision avoidance control by the collision avoidance control section 2311. Accordingly, the obstacle detection device 87 does not perform the above-described matching determination processing, and transmits the distance to the obstacle, which is included in the detection information on the obstacle from the image processing device 86, to the collision avoidance control section 2311. In this way, the increase in the processing load caused by the matching determination processing is avoided.

OTHER EMBODIMENTS

A description will be made on other embodiments of the present invention. Note that a configuration of each of the other embodiments described below can be applied not only independently but can also be applied in combination with the configuration of another embodiment.

(1) The configuration of the work vehicle can be changed in various ways.

For example, the work vehicle may be configured to have a semi-crawler specification that includes right and left crawlers instead of the right and left rear wheels 11.

For example, the work vehicle may be configured to have a full-crawler specification that includes the right and left crawlers instead of the right and left front wheels 10 and the right and left rear wheels 11.

For example, the work vehicle may be configured to have a rear-wheel steering specification in which the right and left rear wheels 11 function as steering wheels.

For example, the work vehicle may be configured to have an electric specification that includes an electric motor instead of the engine 14.

For example, the work vehicle may be configured to have a hybrid specification that includes the engine 14 and the electric motor for travel.

(2) As the active sensors 85A to 85C, radar sensors may be adopted instead of the lidar sensors 85A, 85B and the sonar 85C.

Alternatively, the lidar sensor may be adopted for all of the active sensors 85A to 85C.

(3) The active sensors 85A to 85C may be configured to measure the distance to the obstacle when the image processing device 86 detects the obstacle in any of the measurement ranges Rm1 to Rm4 of those active sensors 85A to 85C.

With this configuration, the active sensors 85A to 85C do not have to constantly make the measurements in the measurement ranges Rm1 to Rm4 thereof, and make the measurements only when the image processing device 86 detects the obstacle in any of those measurement ranges Rm1 to Rm4. Thus, it is possible to improve accuracy of the distance measurement for the obstacle while reducing the load required for the distance measurement.

(4) The active sensors 85A to 85C may be configured to constantly make the measurements in the measurement ranges Rm1 to Rm4 of those and to constantly transmit the measurement values to the obstacle detection device 87. With this configuration, the obstacle detection device 87 can always receive the measurement values from the active sensors 85A to 85C. Thus, in the case where the obstacle is detected by any of the imaging devices 81 to 84, it is possible to identify the position of the obstacle and the distance to the obstacle, which are based on the measurement values from the active sensors 85A to 85C, at a stage with a small time lag from the detection of the obstacle.

(5) A stereo camera or the like may be adopted for each of the imaging devices 81 to 84.

In addition, as the imaging devices 81 to 84, a front camera that has a different angle of view from the front camera 81 may be provided in addition to the front camera 81, the rear camera 82, the right camera 83, and the left camera 84.

Figure 17:
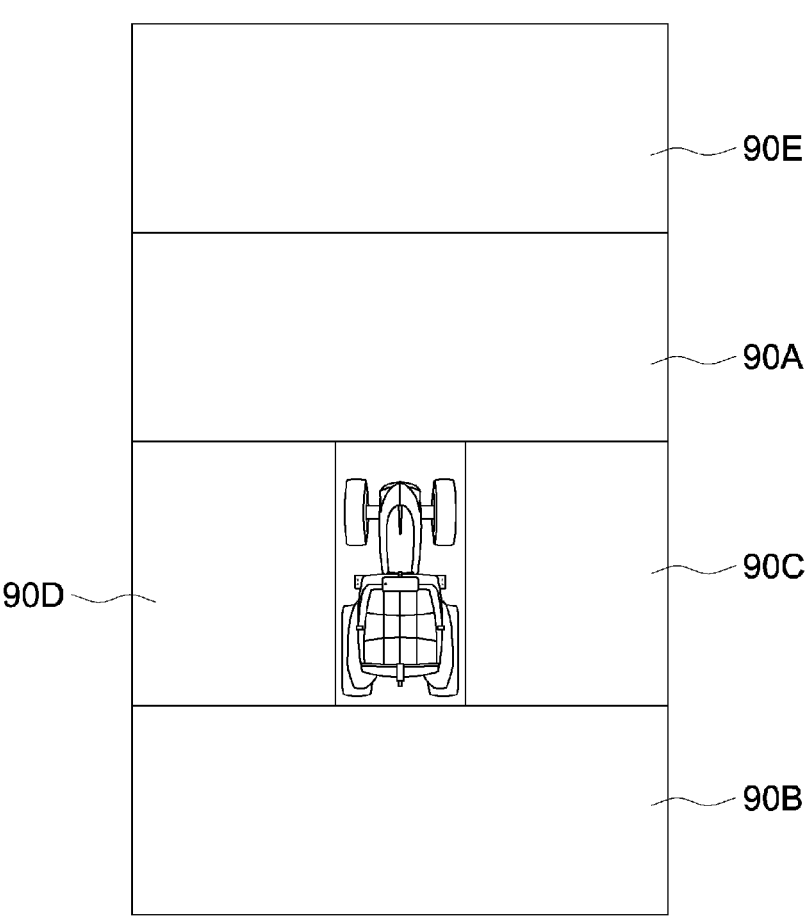
FIG. 17 is a view illustrating an example of arrangement of a camera image on a liquid crystal monitor or a display device in another embodiment.

In this case, for example, as illustrated in FIG. 17, the all-around image display area 90 of each of the liquid crystal monitor 27, the display device 50, and the like may include a second front image display area 90E in which an image of the front camera having the different angle of view is arranged, in addition to the front image display area 90A in which the image of the front camera 81 is arranged, the rear image display area 90B in which the image of the rear camera 82 is arranged, the right image display area 90C in which the image of the right camera 83 is arranged, and the left image display area 90D in which the image of the left camera 84 is arranged.

INDUSTRIAL APPLICABILITY

The obstacle detection system for the work vehicle according to the present invention can be applied to the occupant work vehicles, such as the tractor, the passenger mower, the passenger transplanter, the combine, the carrier, the snowplow, and the wheel loader, and the unmanned work vehicles such as the unmanned mower, for example.

DESCRIPTION OF REFERENCE NUMERALS

1 Work vehicle
81 Imaging device (front camera)
82 Imaging device (front camera)
83 Imaging device (right camera)
84 Imaging device (left camera)
86 Image processing device
85A Active sensor (front lidar sensor)
85B Active sensor (rear lidar sensor)
85C Active sensor (sonar)
87 Obstacle detection device
The invention claimed is:

1. An obstacle detection system for a work vehicle comprising:
a plurality of imaging devices, each of which captures an image of surroundings of the work vehicle; and
an image processing device that performs obstacle discrimination processing for discriminating an obstacle on the basis of the images from the plurality of imaging devices by a time division system, wherein
the image processing device changes a processing target cycle per unit time for each of the imaging devices in the time division system according to a travel direction and a vehicle speed of the work vehicle.

2. The obstacle detection system for the work vehicle according to claim 1 further comprising:
a plurality of active sensors, each of which measures a distance to a measurement target object present in the surroundings of the work vehicle; and
an obstacle detection device that detects a position of the obstacle and a distance to the obstacle on the basis of discrimination information from the image processing device and measurement information from each of the active sensors.

3. The obstacle detection system for the work vehicle according to claim 2, wherein
the image processing device calculates coordinates of the obstacle and the distance to the obstacle on the image on the basis of the image from the imaging device,
the active sensors are lidar sensors that sequentially measure a distance per coordinate of each of ranging points present as the measurement target objects in the surroundings of the work vehicle so as to extract a ranging point group of an obstacle candidate, and
the obstacle detection device adopts a matching distance of the ranging point group as the distance to the obstacle in the case where the coordinates of the obstacle and the distance to the obstacle from the image processing device match the distance per coordinate of the ranging point group from the lidar sensors, and adopts the distance to the obstacle from the image processing device in a case of non-matching.

4. The obstacle detection system for the work vehicle according to claim 2, wherein the active sensors measure the distance to the obstacle when the image processing device detects the obstacle.

\* \* \* \* \*